US012622342B2

(12) United States Patent
Schaffert et al.

(10) Patent No.: US 12,622,342 B2
(45) Date of Patent: May 12, 2026

(54) MODULAR WHEEL ASSEMBLY

(71) Applicant: SCHAFFERT MANUFACTURING COMPANY, INC., Indianola, NE (US)

(72) Inventors: Paul E. Schaffert, Indianola, NE (US); Kris Schaffert, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 1056 days.

(21) Appl. No.: 17/576,506

(22) Filed: Jan. 14, 2022

(65) Prior Publication Data

US 2023/0225240 A1 Jul. 20, 2023

(51) Int. Cl.
*A01C 5/06* (2006.01)
(52) U.S. Cl.
CPC ..................................... *A01C 5/068* (2013.01)
(58) Field of Classification Search
CPC ................................ A01C 5/068; A01B 15/16
See application file for complete search history.

(56) References Cited

U.S. PATENT DOCUMENTS

| | | | |
|---|---|---|---|
| 13,683 | A | 10/1855 | Mccormick |
| 35,510 | A | 6/1862 | De Haven |
| 122,299 | A | 12/1871 | Wight et al. |
| 166,597 | A | 8/1875 | Evans |
| 176,708 | A | 4/1876 | Templin |
| 203,207 | A | 4/1878 | Springer |
| 211,601 | A | 1/1879 | Springer |

| | | | |
|---|---|---|---|
| 252,265 | A | 1/1882 | Scofield |
| 288,661 | A | 11/1883 | Purdy et al. |
| 291,127 | A * | 1/1884 | Austin ................. A01B 63/166 172/384 |
| 308,327 | A | 11/1884 | Runstetler |
| 322,841 | A | 7/1885 | Miskimen |
| 555,897 | A | 3/1896 | Crane |
| 700,109 | A | 5/1902 | Wilkinson |
| 889,947 | A | 6/1908 | Miller |

(Continued)

FOREIGN PATENT DOCUMENTS

| | | |
|---|---|---|
| AU | 2017399124 A1 | 8/2019 |
| CA | 3052323 A1 | 8/2018 |

(Continued)

OTHER PUBLICATIONS

Author Unknown , "1200 Series Advanced Seed Meter Planters", Case IiI, 2005, 1-35.

(Continued)

*Primary Examiner* — Christopher J Sebesta
*Assistant Examiner* — Joel F. Mitchell
(74) *Attorney, Agent, or Firm* — Dorsey & Whitney LLP

(57) ABSTRACT

A press wheel includes a hub configured to rotate about an axis. The press wheel may further include a mounting portion removably attachable to the hub and having a center plane substantially perpendicular to the axis upon removable attachment with the hub. The press wheel may further include a plurality of tread portions connected to the mounting portion and configured to define a circumferential portion of the press wheel. The plurality of tread portions may have voids between adjacent tread portions. Each tread portion of the plurality of tread portions may include a tine extending away from the center plane.

19 Claims, 10 Drawing Sheets

(56)　　　　　　References Cited

U.S. PATENT DOCUMENTS

| | | | | |
|---|---|---|---|---|
| 907,278 | A | 12/1908 | Patrick | |
| 909,137 | A | 1/1909 | Bellerive | |
| 952,447 | A | 3/1910 | Hammonds | |
| 974,247 | A | 11/1910 | Douglass et al. | |
| 1,006,589 | A * | 10/1911 | Noonan et al. | A01B 15/16 |
| | | | | 172/535 |
| 1,059,534 | A | 4/1913 | Forrest | |
| 1,103,938 | A * | 7/1914 | Campbell | E02F 3/815 |
| | | | | 172/252 |
| 1,377,073 | A | 5/1921 | Hobson | |
| 1,473,297 | A | 11/1923 | Knight | |
| 1,483,789 | A | 2/1924 | Earhart | |
| 1,498,378 | A | 6/1924 | Irwin | |
| 2,039,166 | A | 4/1936 | Hoepfner | |
| 2,061,694 | A | 11/1936 | Cuddigan | |
| 2,401,577 | A | 6/1946 | Melling | |
| 2,533,374 | A | 12/1950 | Hyland | |
| 2,601,591 | A | 6/1952 | Colombo | |
| 2,603,049 | A * | 7/1952 | Mullin | A01B 23/06 |
| | | | | 172/535 |
| 2,668,490 | A | 2/1954 | Oehler et al. | |
| 2,805,486 | A | 9/1957 | Barrett | |
| 2,849,969 | A | 9/1958 | Taylor | |
| 2,872,883 | A | 2/1959 | Padrick | |
| 2,912,055 | A | 11/1959 | Buddingh et al. | |
| 2,991,836 | A | 7/1961 | Swanson | |
| 3,115,192 | A | 12/1963 | Bushmeyer | |
| 3,173,498 | A | 3/1965 | Heilbrun | |
| 3,177,830 | A | 4/1965 | Zimmerman | |
| 3,212,585 | A | 10/1965 | Bezzerides | |
| 3,306,371 | A | 2/1967 | Bush | |
| 3,336,885 | A | 8/1967 | Lebow | |
| 3,599,729 | A | 8/1971 | Greemore | |
| 3,734,201 | A | 5/1973 | Zaun | |
| 3,895,589 | A | 7/1975 | Garner et al. | |
| 4,037,755 | A | 7/1977 | Reuter | |
| 4,070,974 | A | 1/1978 | Stacy, Jr. | |
| 4,108,089 | A | 8/1978 | van der Lely | |
| 4,148,267 | A | 4/1979 | Bennett et al. | |
| 4,253,412 | A | 3/1981 | Hogenson | |
| 4,276,836 | A | 7/1981 | Pust | |
| 4,294,181 | A | 10/1981 | Smith | |
| 4,373,455 | A | 2/1983 | Friggstad | |
| 4,398,478 | A | 8/1983 | Frase et al. | |
| 4,407,207 | A | 10/1983 | Dreyer | |
| 4,542,705 | A | 9/1985 | Orth | |
| 4,565,141 | A | 1/1986 | Kopecky | |
| 4,580,507 | A | 4/1986 | Dreyer et al. | |
| 4,607,581 | A | 8/1986 | Kopecky | |
| 4,628,841 | A | 12/1986 | Powilleit | |
| 4,671,193 | A | 6/1987 | States | |
| 4,674,419 | A | 6/1987 | Kopecky | |
| 4,744,316 | A | 5/1988 | Lienemann et al. | |
| 4,819,737 | A | 4/1989 | Frase | |
| 4,834,189 | A | 5/1989 | Peterson et al. | |
| 4,858,698 | A | 8/1989 | Williamson et al. | |
| D305,337 | S | 1/1990 | Plummer | |
| 4,911,090 | A | 3/1990 | Schimke | |
| 5,000,270 | A | 3/1991 | Phillips | |
| 5,022,333 | A * | 6/1991 | McClure et al. | A01C 5/068 |
| | | | | 172/519 |
| 5,078,528 | A | 1/1992 | Schmidt | |
| 5,092,255 | A | 3/1992 | Long et al. | |
| 5,163,518 | A | 11/1992 | Foley | |
| 5,341,754 | A | 8/1994 | Winterton | |
| 5,361,848 | A | 11/1994 | Fleischer et al. | |
| 5,375,542 | A | 12/1994 | Schaffert | |
| 5,398,771 | A | 3/1995 | Hornung et al. | |
| 5,419,402 | A | 5/1995 | Heintzman | |
| 5,425,318 | A | 6/1995 | Keeton | |
| 5,443,023 | A | 8/1995 | Carroll | |
| 5,461,995 | A | 10/1995 | Winterton | |
| 5,497,836 | A | 3/1996 | Groff | |
| 5,517,932 | A | 5/1996 | Ott et al. | |
| D377,356 | S | 1/1997 | Bruns | |
| 5,626,196 | A | 5/1997 | Hughes | |
| 5,628,372 | A | 5/1997 | Creyke | |
| 5,640,915 | A | 6/1997 | Schaffert | |
| 5,645,000 | A | 7/1997 | Carroll | |
| 5,662,173 | A | 9/1997 | Blesing | |
| 5,673,638 | A | 10/1997 | Keeton | |
| D386,191 | S | 11/1997 | Bruns | |
| 5,730,074 | A | 3/1998 | Peter | |
| 5,732,780 | A | 3/1998 | Nikkel et al. | |
| D396,863 | S | 8/1998 | Bruns | |
| 5,852,982 | A | 12/1998 | Peter | |
| 5,884,711 | A | 3/1999 | Shoup | |
| 5,896,932 | A | 4/1999 | Bruns et al. | |
| 5,904,107 | A | 5/1999 | Kester | |
| 5,918,557 | A | 7/1999 | Schaffert | |
| 5,970,891 | A | 10/1999 | Schlagel | |
| 5,996,514 | A | 12/1999 | Arriola et al. | |
| 6,082,274 | A | 7/2000 | Peter | |
| 6,082,275 | A | 7/2000 | Schaffert | |
| 6,119,608 | A | 9/2000 | Peterson et al. | |
| 6,148,747 | A | 11/2000 | Deckler et al. | |
| D440,985 | S | 4/2001 | Noonan et al. | |
| 6,209,466 | B1 | 4/2001 | Wodrich | |
| 6,220,191 | B1 | 4/2001 | Peter | |
| 6,283,050 | B1 | 9/2001 | Schaffert | |
| 6,314,897 | B1 | 11/2001 | Hagny | |
| 6,321,667 | B1 | 11/2001 | Shoup | |
| 6,453,832 | B1 | 9/2002 | Schaffert | |
| 6,530,334 | B2 | 3/2003 | Hagny | |
| 6,640,732 | B2 | 11/2003 | Prairie et al. | |
| 6,763,773 | B2 | 7/2004 | Schaffert | |
| 6,918,343 | B2 | 7/2005 | Kester | |
| 7,121,216 | B2 | 10/2006 | Schaffert | |
| 7,246,563 | B2 | 7/2007 | Kester | |
| 7,322,302 | B1 | 1/2008 | Reidhar | |
| 7,360,495 | B1 | 4/2008 | Martin | |
| 7,410,005 | B2 | 8/2008 | Lung et al. | |
| 7,520,338 | B2 | 4/2009 | Stokes | |
| D594,477 | S | 6/2009 | Dawson et al. | |
| 7,552,689 | B2 | 6/2009 | Schaffert | |
| 7,581,503 | B2 | 9/2009 | Martin | |
| D611,507 | S | 3/2010 | Martin | |
| 7,707,952 | B2 | 5/2010 | Schaffert | |
| 7,730,961 | B2 | 6/2010 | Ward et al. | |
| 7,810,580 | B2 * | 10/2010 | Swanson | A01C 5/064 |
| | | | | 172/604 |
| 7,975,629 | B1 | 7/2011 | Martin | |
| 8,047,301 | B2 | 11/2011 | Friggstad et al. | |
| D663,326 | S | 7/2012 | Allensworth et al. | |
| 8,267,021 | B2 | 9/2012 | Mariman et al. | |
| 8,291,998 | B1 | 10/2012 | Berg et al. | |
| 8,333,161 | B2 | 12/2012 | Arnett et al. | |
| 8,356,563 | B2 | 1/2013 | Schaffert et al. | |
| 8,359,988 | B2 | 1/2013 | Bassett | |
| 8,397,612 | B2 | 3/2013 | Koplin et al. | |
| 8,544,398 | B2 | 10/2013 | Bassett | |
| 8,555,798 | B2 | 10/2013 | Friggstad et al. | |
| D699,267 | S | 2/2014 | Nelson | |
| 8,863,857 | B2 | 10/2014 | Bassett | |
| 8,910,581 | B2 | 12/2014 | Bassett | |
| 8,910,582 | B2 | 12/2014 | Mariman et al. | |
| 8,939,095 | B2 | 1/2015 | Freed | |
| D727,975 | S | 4/2015 | Brockway | |
| D727,976 | S | 4/2015 | Brockway | |
| 9,204,590 | B2 | 12/2015 | Schaffert et al. | |
| 9,232,689 | B2 | 1/2016 | Trevino et al. | |
| 9,365,996 | B2 | 6/2016 | Brockway | |
| 9,516,803 | B1 | 12/2016 | Rosenboom | |
| 9,681,599 | B2 | 6/2017 | Whalen et al. | |
| 10,060,467 | B2 | 8/2018 | Schaffert et al. | |
| D844,675 | S | 4/2019 | Schaffert | |
| 10,383,274 | B2 | 8/2019 | Whalen et al. | |
| 10,624,252 | B2 | 4/2020 | Nance | |
| D883,345 | S | 5/2020 | Schaffert | |
| 10,798,870 | B2 | 10/2020 | Schaffert et al. | |
| 11,266,063 | B2 | 3/2022 | Schaffert et al. | |
| 11,477,931 | B2 | 10/2022 | Hake et al. | |
| 2002/0078869 | A1 | 6/2002 | Brummelhuis | |
| 2003/0051650 | A1 | 3/2003 | Engelke et al. | |

(56) References Cited

U.S. PATENT DOCUMENTS

| | | | |
|---|---|---|---|
| 2005/0072344 A1 | 4/2005 | Kester | |
| 2005/0155536 A1 | 7/2005 | Wendte et al. | |
| 2007/0113763 A1 | 5/2007 | Schaffert | |
| 2007/0278272 A1 | 12/2007 | Fast | |
| 2008/0011208 A1 | 1/2008 | Martin | |
| 2008/0066662 A1 | 3/2008 | Hesla | |
| 2008/0257237 A1 | 10/2008 | Friesen et al. | |
| 2008/0303238 A1 | 12/2008 | Fichter | |
| 2009/0000796 A1 | 1/2009 | Cooper et al. | |
| 2009/0056962 A1 | 3/2009 | Martin et al. | |
| 2009/0084295 A1 | 4/2009 | Schaffert | |
| 2009/0235853 A1 | 9/2009 | Schaffert | |
| 2011/0155031 A1 | 6/2011 | Arnett et al. | |
| 2012/0048160 A1 | 3/2012 | Adams et al. | |
| 2012/0210919 A1 | 8/2012 | Van Buskirk et al. | |
| 2012/0210920 A1 | 8/2012 | Bassett | |
| 2012/0241181 A1 | 9/2012 | Horsch | |
| 2012/0325133 A1 | 12/2012 | Whalen et al. | |
| 2013/0074747 A1 | 3/2013 | Schaffert et al. | |
| 2013/0160684 A1 | 6/2013 | Whalen et al. | |
| 2013/0263767 A1 | 10/2013 | Trevino et al. | |
| 2014/0033958 A1 | 2/2014 | Bassett | |
| 2014/0116735 A1 | 5/2014 | Bassett | |
| 2015/0075825 A1 | 3/2015 | Dufty | |
| 2016/0014951 A1 | 1/2016 | Stark et al. | |
| 2016/0050837 A1 | 2/2016 | Schaffert et al. | |
| 2016/0106025 A1 | 4/2016 | Nelson et al. | |
| 2016/0120096 A1 | 5/2016 | Patwardhan et al. | |
| 2017/0000006 A1 | 1/2017 | Raetzman et al. | |
| 2017/0208736 A1 | 7/2017 | Schaffert et al. | |
| 2019/0271356 A1 | 9/2019 | Schaffert et al. | |
| 2019/0364747 A1 | 12/2019 | Freeman | |
| 2020/0396894 A1 | 12/2020 | Radtke et al. | |
| 2021/0161063 A1 | 6/2021 | Schaffert et al. | |
| 2021/0298223 A1* | 9/2021 | Wendler et al. | A01C 5/068 |
| 2021/0301863 A1 | 9/2021 | Schaffert et al. | |
| 2024/0260503 A1 | 8/2024 | Schaffert et al. | |

FOREIGN PATENT DOCUMENTS

| | | | |
|---|---|---|---|
| DE | 3321490 A1 | 12/1984 | |
| DE | 3441610 A1 | 5/1986 | |
| DE | 4235389 A1 | 3/1994 | |
| EP | 1964459 B1 | 12/2011 | |
| GB | 2572309 A | 9/2019 | |
| WO | 2018148776 A1 | 8/2018 | |

OTHER PUBLICATIONS

Author Unknown , "3000 Series Kinze Planters", 2003, 3-6 and 12.
Author Unknown , "8000 Series Planters: Simply Advanced", White Planters, 2001, 13-15.
Author Unknown , "Brochure: The Precision Vacuum Planter, NG Plus Series", A.T.I., Inc., Monosem, Lenexa, Kansas, at least as early as Dec. 21, 2007, Dec 21, 2007, 10 pages.
Author Unknown , "Changing Planting Depth", at least as early as Dec. 21, 2007, Dec 21, 2007, 3 pages.
Author Unknown , "Cost-Effective Solutions for Real-World Needs", Yetter Profitable Solutions, at least as early as Dec. 21, 2007, Dec 21, 2007, 1-29.

Author Unknown , "Dawn 1572/1500 Coulter Combo", Jul. 28, 2004, Jul 28, 2004, 2 pages.
Author Unknown , "Dawn Curvtine™ Closing Wheel", 1997, 2 pages.
Author Unknown , "Dawn Trashwheels Row Cleaner", at least as early as Dec. 21, 2007, Dec 21, 2007, 1 page.
Author Unknown , "Ferti-Placer", Schaffert Manufacturing Co., Inc., at least as early as Dec. 21, 2007, Dec 21, 2007, 2 pages.
Author Unknown , "Groff AG Improvements, LLC", at least as early as Dec. 21, 2007, Dec 21, 2007, 4 pages.
Author Unknown , "Hawkins Manufacturing Inc.", at least as early as 2002, 2002, 1 page.
Author Unknown , "Heavy-Duty Coulter", at least as early as Dec. 21, 2007, Dec. 21, 2007, 3 pages.
Author Unknown , "http://precisionplanting.com/html/keeton.html"; at least as early as Dec. 30, 2000, Dec. 30, 2000, 1 page.
Author Unknown , "Keeton Seed Firmer", J & K Enterprises, 1994, 2 pages.
Author Unknown , "Keeton Seed Firmer, Precision Planting", at least as early as Apr. 9, 2001, Apr. 9, 2001, 4 pages.
Author Unknown , "Photos Labeled "Photo A" and "Photo B"", Oct. 17, 2007, Oct. 17, 2007, 1 page.
Author Unknown , "Planter "N" Forcer, Planter Fertilizer Attachments online product information description", Hawkins Mfg. Inc. Retrieved from http://www.hawkinsmfg.com/ attachments.htm on Dec. 9, 2012, Dec. 9, 2012, 2 pages.
Author Unknown , "Planter Fertilizer Attachments", Hawkins Manufacturing Inc., at least as early as Dec. 21, 2007, Dec. 21, 2007, 4 pages.
Author Unknown , "Seed to Soil Inforcer", Seed Flap, Spring 1995, 1995, 1 page.
Author Unknown , "Sunco: Effectively Moves Trash in All Conditions!", at least as early as Dec. 21, 2007, Dec. 21, 2007, 2 pages.
Author Unknown , "Sunco: Your Solution for Accurate Starter Fertilizer Placement", at least as early as Dec. 21, 2007, Dec. 21, 2007, 2 pages.
Author Unknown , "Tine-Tooth Row Tillage Attachment", at least as early as Dec. 21, 2007, Dec. 21, 2007, 9 pages.
Author Unknown , "Tube Alignment Brackets", M & J Cotton Farms, Inc., at least as early as Oct. 30, 1995, Oct. 30, 1995, 1 page.
Author Unknown , "We Know It's All About Strong Roots", Yetter Profitable Solutions, at least as early as Dec. 21, 2007, Dec. 21, 2007, 1-29.
Author Unknown , "Yield-Pro Planters: Unsurpassed in form, function and safety", Great Plains, at least as early as Dec. 21, 2007, Dec. 21, 2007, 4, 5 and 10.
Author Unknown , "Yield-Pro Planters: Yield increasing row spacing options coupled with best in class productivity and accuracy", at least as early as Dec. 21, 2007, Dec. 21, 2007, 3 pages.
Finck , "Where to start with starter fertilizer", Farm Journal, Jan. 1996, Jan. 1996, 15-16.
Prosecution Document , "US Application filed Mar. 23, 2012", U.S. Appl. No. 13/428,922, filed Mar. 23, 2012, 136 pages.
Prosecution Document, "US Utility Patent Application filed Oct. 5, 2012", U.S. Appl. No. 13/646,507, 126 pages.
Agco, "Tye, Parts Catalog, 2015/2020 Rice and Soybean Drill EFF. S/N K-6-1367-10-RD," Jun. 1996, Form No. 79017760, Litho in U.S.A., 3 pages.

* cited by examiner

1100

UNCOUPLING A FIRST MOUNTING PORTION
FROM A PREDETERMINED MOUNTING LOCATION
OF A HUB OF A PRESS WHEEL

1104

COUPLING A SECOND MOUNTING PORTION
FROM THE PREDETERMINED MOUNTING LOCATION
OF THE HUB OF THE PRESS WHEEL

1108

MODULAR WHEEL ASSEMBLY

FIELD

The described examples relate generally to press wheels for furrow closing assemblies, and methods of use thereof.

BACKGROUND

Multi-row planters may be used for agricultural seed planting. A planter may include multiple row units config-ured for opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow. Further, a press wheel or firmer wheel may often be used for compacting the soil in the seeded furrows after the soil has been planted and, in some instances, after a closing wheel has deposited loose soil overtop of the seed.

Conventional press wheels may include a hub having a fixed diameter from a central rotational axis of the press wheel. Conventional press wheels may, in some cases, have one or more tines that extend from the hub at a fixed length or other dimension. The dimensions of the press wheel, such as the dimensions of the hub and/or the tine, may impact the performance of the press wheel in the field. As one example, the size of the tine may impact the amount of soil placed over the seed. Different end users may require different amounts of soil be placed over the seed based on a variety of field and seed conditions. Accordingly, conventional techniques may limit the ability of a user to adapt to field conditions and change the performance of the press wheel, absent completely replacing a press for another. As such, there is a need for systems and techniques to improve the adaptability of press wheels for a variety of field conditions and user preferences.

SUMMARY

Examples of the present invention are directed to modular wheel assemblies and methods of use thereof.

In one example, a modular press wheel is disclosed. The modular press wheel includes a hub configured to rotate about an axis. The modular press wheel further includes a first rim feature. The first rim feature includes a first mount-ing portion removably attachable to the hub. The first rim feature further includes a first set of tread portions connected to the first mounting portion and configured to define a first circumferential portion of the modular press wheel. The modular press wheel further includes a second rim feature. The second rim feature includes a second mounting portion removably attachable to the hub. The second rim feature further includes a second set of tread portions connected to the second mounting portion and configured to define a second circumferential portion of the modular press wheel.

In another example, for at least the first set of tread portions, each tread portion of the first set of tread portions may include a tine extending away from a center plane of the first mounting portion. The center plane may be substantially perpendicular to the axis upon removable attachment of the first rim feature with the hub. The tine define may define a chord relative to a radial surface of the first mounting portion.

In another example, at least the first mounting portion may include a first mounting plate having an inner curved edge, and an outer curved edge opposite the inner curved edge. The first set of tread portions may be connected to the first mounting plate along the outer curved edge. The hub may include a rim feature engagement surface. Further, the first mounting plate may include a hub engagement surface extending from the inner curved edge to the outer curved edge. In some cases, the hub and the first mounting portion may be removably attachable to one another via a lap joint defined along a portion of the rim feature engagement surface and a portion of the hub engagement surface.

In another example, the hub may include a series of hub holes circumferentially spaced about the axis. The first mounting plate may include a series of first mounting plate holes circumferentially spaced about the axis. The first mounting plate holes may be alignable with the series of hub holes, upon removable attachment of the first mounting plate with the hub. In some cases, the modular press wheel may further include a fastener configured to removably attach the hub and the first mounting plate and advanceable through an aligned pair of a hub hole of the series of hub holes and a first mounting plate hole of the series of first mounting plate holes.

In another example, upon removable attachment of the hub and the first mounting portion, the outer curved edge extends beyond an outermost circumferential edge of the hub. The first and second circumferential portions may be adjacent circumferential portions of the modular press wheel.

In another example, a modular press wheel is disclosed. The modular press wheel includes a hub configured to rotate about an axis. The modular press wheel includes a mounting portion removably attachable to the hub and having a center plane substantially perpendicular to the axis upon removable attachment with the hub. The modular press wheel includes a plurality of tread portions connected to the mounting portion and configured to define a circumferential portion of the modular press wheel. The plurality of tread portions includes voids between adjacent tread portions, wherein each tread portion of the plurality of tread portions com-prises a tine extending away from the center plane.

In one example, the mounting portion may be one of a set of mounting portions. Each mounting portion of the set of mounting portions may be removably attachable with the hub and connected with a corresponding plurality of tines that cooperate to define a complete circumferential portion of the modular press wheel. In some cases, the set of mounting portions includes four mounting portions. Each mounting portion of the four mounting portions may have a common arcuate shape that is configured to establish the four mounting portions in a substantially circular shape when the four mounting portions are arranged end to end with one another.

In another example, each mounting portion of the set of mounting portions may contact one or more adjacent mount-ing portions upon removable attachment of the mounting portion with the hub. Further, a shape or a size of the tine of the respective tread portion may vary along the circumfer-ential portion.

In another example, the mounting portion may include a mounting plate defining a series of slots along an outermost circumferential edge of the mounting portion. The plurality of tread portions may be connected to the mounting portion via welds formed between a slot of the series of slots and the tine of the respective tread portion.

In another example, the mounting portion may be a first mounting portion having a first size. The plurality of tread portions may be a first plurality of tread portions. In this regard, the modular press wheel may further include a second mounting portion having a second size and that is removably attachable to the hub and connected with a second plurality of tread portions. In a first configuration, the first mounting portion may be removably attached to the hub at a predetermined mounting location with the first plurality of tread portions spaced apart from the axis based on the first size of the first mounting portion. In a second configuration, the second mounting portion is removably attached to the hub at the predetermined mounting location with the second plurality of tread portions spaced apart from the axis based on the second size of the second mounting portion, the second size larger than the first size.

In another example, a method for modifying a modular press wheel is disclosed. The method includes uncoupling a first mounting portion from a predetermined mounting location of a hub of the modular press wheel. The first mounting portion may have a first size and may be connected to a first plurality of tread portions. The first plurality of tread portions may define a circumferential portion of the modular press wheel. The method may further include coupling a second mounting portion to the predetermined mounting location of the hub. The second mounting portion may have a second size and may be connected to a second plurality of tread portions. The second plurality of tread portions may define the circumferential portion upon the coupling of the second mounting portion of the predetermined mounting location.

In another example, the second size may be larger than the first size such that the coupling of the second mounting portion to the predetermined mounting location increases a radius of the modular press wheel.

In another example, the second plurality of tread portions may have a different size, shape or arrangement than the first plurality of tread portions. In this regard, the coupling of the second mounting portion to the predetermined mounting location may change the size, shape, or arrangement of tread portions along the circumferential portion of the modular press wheel.

In another example, the uncoupling of the first mounting portion may further include loosening a fastener and removing the fastener from an aligned pair of a hub hole of the hub and a first mounting portion hole of the first mounting portion. Further, the coupling of the second mounting portion may further include extending the fastener through an aligned pair of the hub hole and a second mounting portion hole of the second mounting portion.

In addition to the exemplary aspects and examples described above, further aspects and examples will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
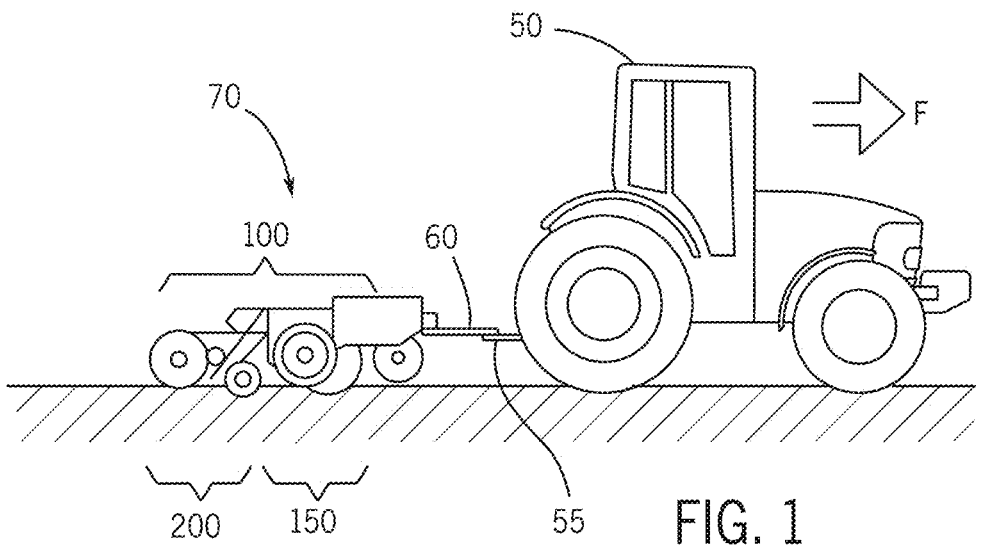
FIG. 1 depicts a side view of an agricultural tractor and an agricultural planter.

The description that follows includes sample systems, methods, and apparatuses that embody various elements of the present disclosure. However, it should be understood that the described disclosure may be practiced in a variety of forms in addition to those described herein.

The following disclosure relates generally to modular press wheels and associated systems and methods of use thereof. Broadly, a press wheel may be substantially any type of wheel or firming device that is configured for compacting the soil in the seeded furrows after the soil has been planted. For example, the press wheel may be configured to generally compact the soil in order to promote seed germination by minimizing air pockets. This can improve the capillary action of the moisture in the soil as well as reducing wind erosion of the soil over the seed.

To facilitate the foregoing, a press wheel may generally include a hub that is configured to rotate about an axis. The hub may include or otherwise be connected with a plurality of tread portions arranged along a circumferential portion of the hub. In one example, the tread portions may include tines and/or other structures that extend from the hub for engagement with the soil. The tine or tread portions may have voids between adjacent tines such that a circumferential edge of the hub or press wheel and one or both adjacent tines may contact the ground together to promote firming. The diameter of the hub as well as the size and shape of the tread portions or tines may impact the performance of the press wheel in the field. As one example, larger tines may encourage more soil placement over a seed as compared with smaller tines. However, conventional press wheels often include a fixed diameter wheel and/or a fixed size and shape tread portion or tine. The conventional arrangement may therefore limit the ability of a farmer to adapt the press wheel to different field conditions and farmer preferences.

The modular press wheel of the present disclosure may mitigate such hindrances by providing a reconfigurable and adaptable press wheel. For example, the modular press wheel of the present disclosure may include one or more universal components that is removably coupleable with one or more modular components. The one or more modular components may have a different size, shape, configuration, material, and/or other property. Accordingly, the one or more universal components and the one or more modular components may cooperate with one another in order to change the characteristics of the press wheel, such as changing one or more of a diameter of the hub and/or a size and/or shape of one or more of the tread portions. In this regard, the one or more universal components and the one or more modular components may cooperate with one another in order to change the performance of the press wheel, including changing the press wheel in order to cause the press wheel to move more or less soil over the seed, as may be desired.

In one example, the modular press wheel includes a hub and one or more rim features. The hub may be a universal component of the modular press wheel. For example, the hub may generally be a circular or wheel-type or plate-type component that is configured to rotate about an axis. For example, the hub may include a central mounting feature that is configured for mounting on or otherwise coupling to an axle component of a furrow closing assembly or other assembly. The rim features may be modular components of the modular press wheel. For example, the rim features may be removably coupleable with the hub in order to define or form the modular press wheel and establish the modular press wheel as having one or more specified characteristics, such as having a predetermined diameter and/or a predetermined size and/or shape of the tread portions.

By way of illustration, one or more of the rim features may include a mounting portion and a set of tread portions. The mounting portion may be formed form a plate or metal sheet and may be generally removably attachable with the hub. For example, the mounting portion may be arranged adjacent the hub in order to define a lap joint therebetween, which may be secured by one or more fasteners. The set of tread portions may be connected to the mounting portion and define a circumferential portion of the rim feature. For example, the set of tread portions may include a plurality of tines that is connected to and circumferentially spaced along an outer arcuate surface or edge of the mounting portion, as one example. The rim feature may be removably coupled to the hub in order to define the set of tread portions of the rim feature as a circumferential portion of the modular press wheel. In this regard, upon removably attachment, the modular press wheel may exhibit, at the given circumferential portion, a diameter and have a tread portion size and shape as defined by the tread portions of the rim feature.

The rim features may therefore facilitate the adaptability and reconfigurability of the modular press wheel by allowing the modular press to have different diameters and shape and sizes of the tread portions, as needed. For example, the rim feature may generally form a lap joint with the hub and extend beyond an outermost edge of the hub. As such, the rim feature, when removably attached to hub, may define or establish the diameter of the hub. This may allow a first rim feature to have a first size that establishes the modular press wheel as having a first diameter. In turn, a second rim feature may have a second size that establishes the modular press wheel as having a second diameter that is different than the first diameter. A farmer or other user may change out the first rim feature for the second feature in order to change a size of the modular press wheel. Continuing the non-limiting example, the first rim feature may include a first set of tread portions having a first size or type, and the second rim feature may include a second set of tread portions having a second size or type. As such, a farmer or other user may also change out the first rim feature for the second feature in order to change a size or type of tread portions.

Multiple rim features may be arranged together with one another to define a complete or continuous circumferential periphery of the modular press wheel. For example, and as shown herein, four rim features, each of a generally common size may each be removably attached to the hub in order to define the continuous circumferential periphery of the modular press wheel. Each of the four rim features may have a common arcuate shape such that when the four rim features are arranged end to end, the four rim features define a substantially circular shape of the modular press wheel. In other cases, more or fewer modular rim features may be used to established the circular shape.

Turning to the Drawings, the modular press wheel of the present disclosure may be used with an agriculture planter 70 having one or more trailing arm assemblies 100, as shown in FIG. 1. Each trailing arm assembly 100 may include a fertilizer furrow opener assembly 150. The fertilizer furrow opener assembly 150 may be configured to open the soil, such as with an opener disc, and optionally supply fertilizer and/or seed to an open furrow. Each trailing arm assembly 100 may also include a trailing furrow closer assembly 200. The trailing furrow closer assembly 200 may be configured to close the soil, such as with a closing wheel. As described and shown herein, one or more press wheels, such as the modular press wheels of the present disclosure may be connected to end of the trailing arm assemblies 110. This may allow the press wheel to firm the soil after closing.

Figure 2:
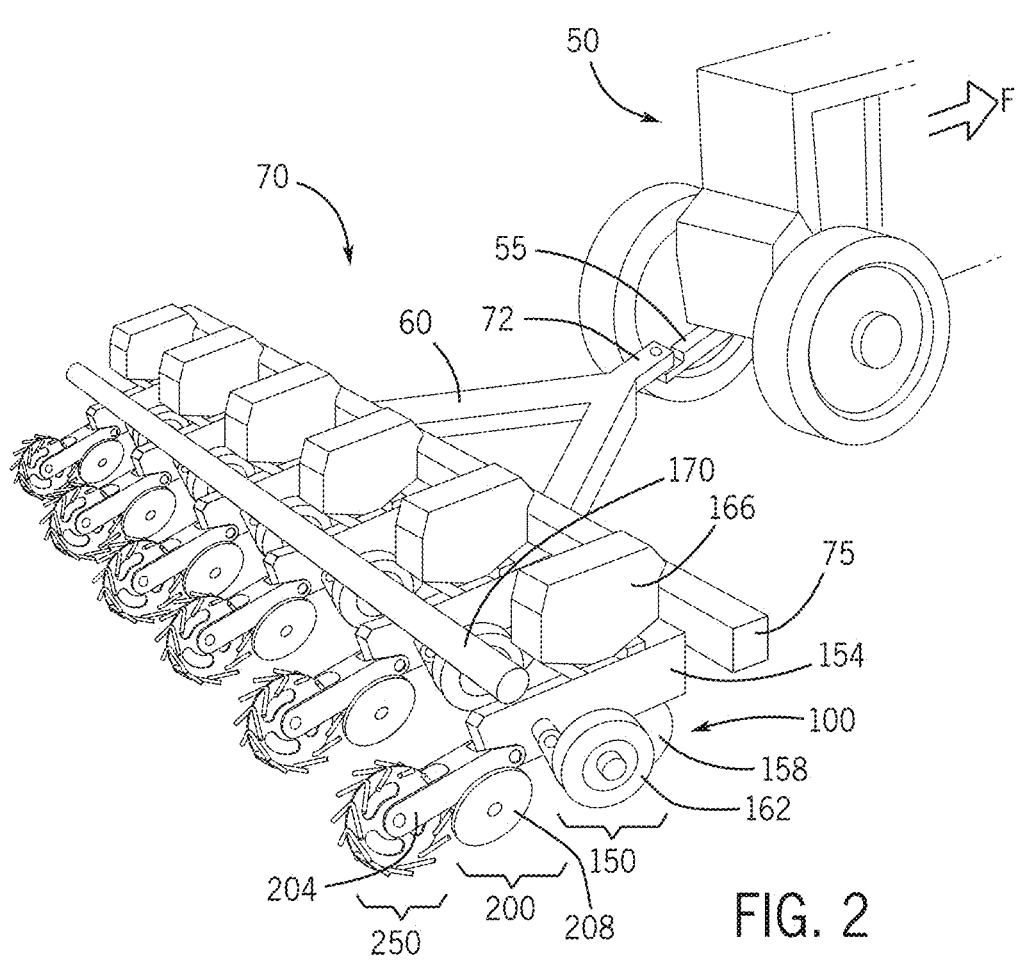
FIG. 2 depicts a top-rear perspective view of the agricultural tractor and agricultural planter of FIG. 1, with a press wheel.

The modular press wheels of the present disclosure may be used with a variety of different planters and trailing arm assemblies. For purposes of illustration, FIGS. 1 and 2 show the planter 70 as including a tongue or hitch 60 for hitching the planter 70 to a hitch 55 of a tractor 50. The tractor 50 tows the planter 70 in the direction of arrow F and provides power to the planter 70 (e.g., via a power take off ("PTO")) for powering the operations of the planter 70. As illustrated in FIG. 2, the planter 70 may include a frame 75 from which the hitch 60 extends and the various planter components are supported. The various components of the planter 70 may include the plurality of trailing arm assemblies 100. The trailing arm assemblies 100 may function as row units for planting seeds and distributing liquid fertilizer, for example, from a common liquid fertilizer tube 170.

While many configurations are possible, each row unit shown in FIG. 2 may include a frame 154 for supporting various components of the planter 70. The row units in FIG. 2 are shown as including a furrow opener disc 158, a gage wheel 162, and a seed hopper 166. Broadly, the seed furrow opener disc 158 may be configured to create a furrow in which the planter 70 deposits seed. The gage wheel 162 may be configured to determine or control a depth at which the planter 70 deposits the seed. The planter 70 may further include a series of the trailing arm assemblies 200, each of which may include a trailing furrow closer wheel 208 followed by a press wheel 250 and associated subassemblies. This configuration allows for treating the soil after the furrow has been closed by the closing wheel 208.

Figure 3:
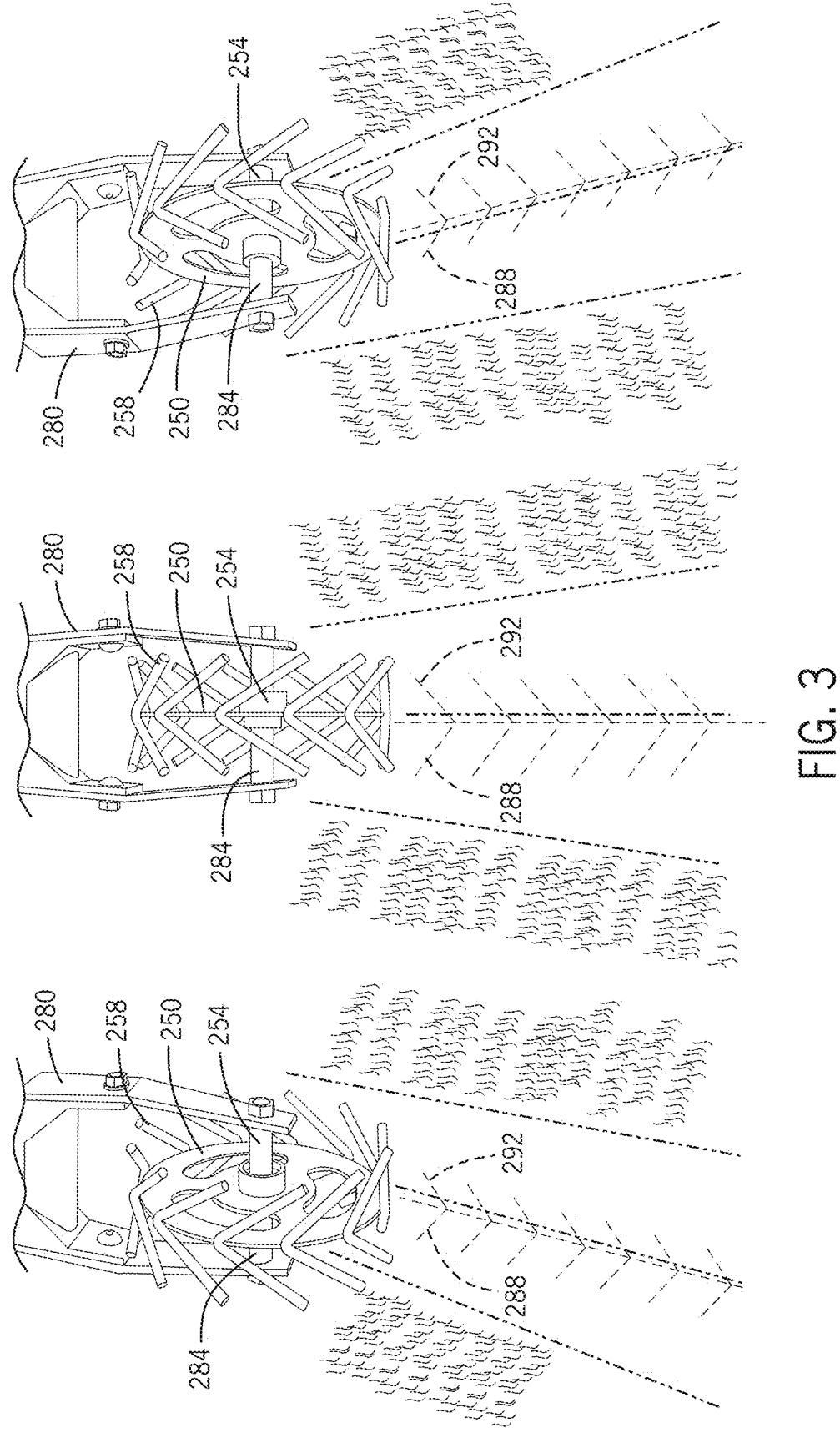
FIG. 3 depicts a rear view of the agricultural planter and the press wheel of FIG. 2.

In one example, the closing wheels 208 may contact the soil and close an open furrow. This operation may form a closed furrow seam 292, as shown in FIG. 3. The press wheel 250 may follow behind respective closing wheels 208 and be connected to the closing assembly 200 via a mounting fork 280. The press wheel 250 may be configured to rotate about an axle 284 that is rotatably connected to the mounting assembly or fork 280. The press wheel 250 may include tread portions 258. In this regard, the press wheel 250 may follow the closing wheels 208 and condition the closed furrow seam 292 using the tread portions 258. For example, the press wheel 250 may apply a downward pressure on the closed furrow 292. The pressure against the soil may come from tread portions 258 and/or a rim. The pressure may be applied without applying pressure from webbing or other material linking the tread portions 258 at any point other than that proximal to a center plane. In one example, the tread portions 258 may extend from each side of a center plane.

As shown in FIG. 3, the press wheel 250 may be approximately centered on the closed furrow seam 292. This position may be independent of the location of either the opener disc 158 or the closing wheels 208. In some cases, the closing wheels 208 may be positioned on the sides of the open furrow in order to close the furrow. As such, additionally or alternatively the press wheel 250 may be centered between the closing wheels and/or positioned in any of a variety of other arrangements as may be appropriate for a given application.

As the press wheel 250 creates a downward pressure, the press wheel 250 and the tread portions 258 may imprint a tread pattern 288 on the ground. The tread pattern 288 may resemble a chicken track. The imprint pattern may be formed because the volume between tread patterns may not contact the soil, limiting contact to either or both of the rim and the tread portion 258. In one example, two lines may extend from and at an angle to a line passing at or close to the closed furrow seam 292. The two lines may be angled in the same direction. The lines may be symmetric, having a common point meeting proximal to the center plane and pointing away from the direction of travel of the tractor 50 and/or arranged in any of a variety of other directions as may be appropriate for a given application.

Figures 4A, 4B, 4C:
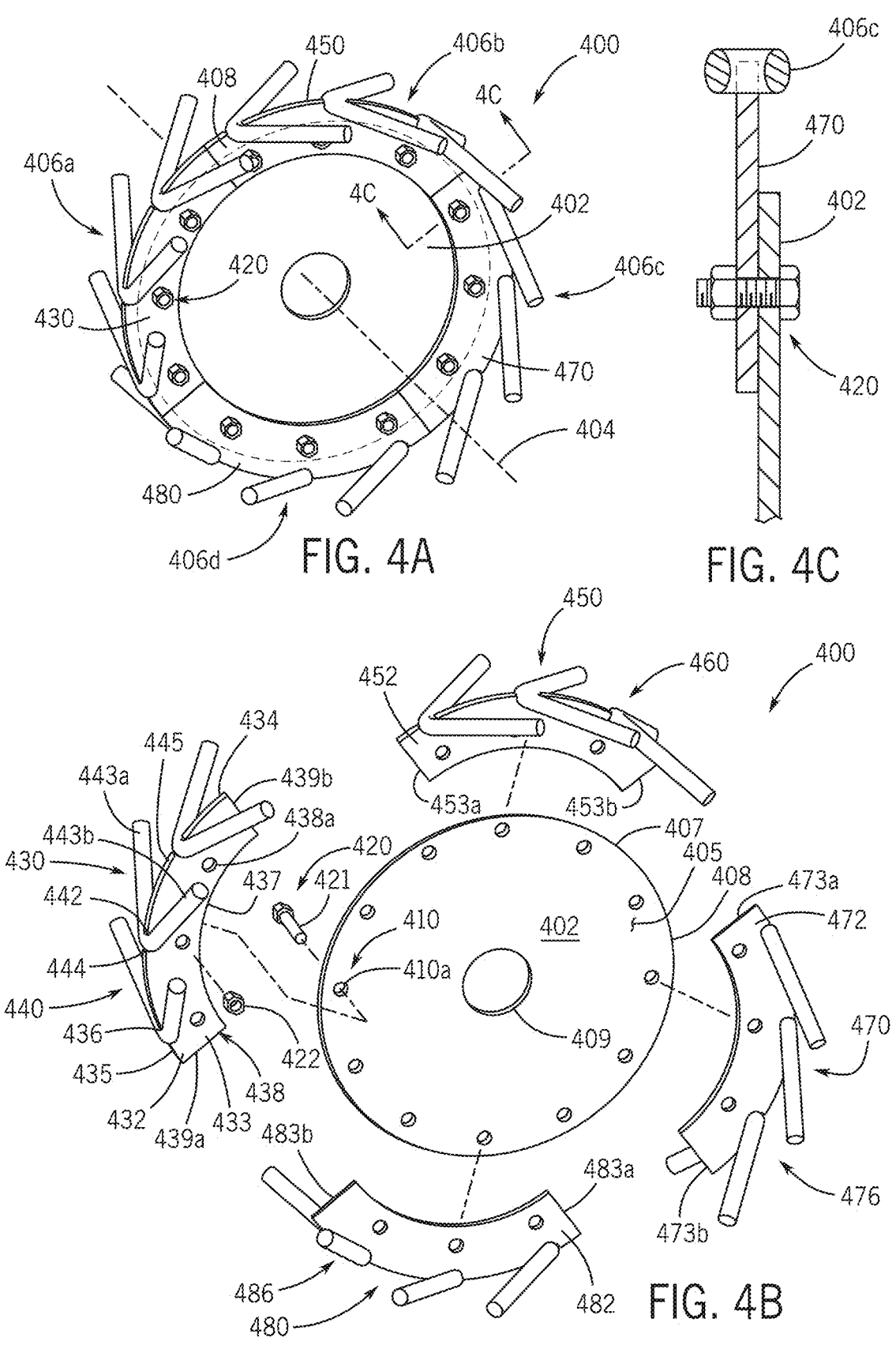
FIG. 4A depicts an example modular press wheel.
FIG. 4B depicts an exploded view of the modular press wheel of FIG. 4A.
FIG. 4C depicts a cross-sectional view of the modular press wheel of FIG. 4A, taken along line 4C-4C of FIG. 4A.

With reference to FIGS. 4A and 4B, a modular press wheel 400 is shown. The modular press wheel 400 may be used with the planter 70 and trailing assemblies 100 discussed generally above with reference to FIGS. 1-3. For example, substantially analogous to the press wheel 250, the modular press wheel 400 of FIGS. 4A an 4B may be used to condition a closed furrow seam and generally firm the soil, as needed. It will therefore be appreciated that the modular press wheel 400 described in relation to FIGS. 4A-4B may function in a manner similar manner to the press wheel 250 show in FIGS. 1-3.

The modular press wheel 400 of FIGS. 4A and 4B includes a hub 402. The hub 402 may be a universal component of the modular press wheel 400. For example, the hub 402 may have a universal or common size. This may allow modular components of various different sizes and configurations to be removably attached to the hub 402 in order to establish the modular press wheel 400 as having predetermined characteristics or performance qualities. As shown in FIG. 4B, the hub 402 may be formed from a plate or sheet or metal material. For example, the hub 402 may be a generally flat component having a first surface 405 and a second surface 407 opposite the first surface 405. The hub 402 may have a generally circular shape in order to form a wheel-type component. For example, the hub 402 may have an outer circumferential edge 408. The outer circumferential edge 408 may be an arcuate or circular perimeter of the hub 402. The hub 402 may be configured to rotate about an axis 404. In this regard, the hub 402 may include or define an axial hole 409. The axial hole 409 may be arranged on a center axis of the hub 402 and be configured to receive an axle component of a trailing assembly, such as an axial component of the trailing assemblies shown above in relation to FIGS. 1-3. The hub 402 may be configured to removably attach with one or more modular components of the modular press wheel 400, as described herein. In this regard, the hub 402 is shown as including or defining a plurality of hub holes 410, such as hub hole 410a. The plurality of hub holes 410 may be circumferentially spaced holes that are arranged generally along the outer circumferential edge 408. The plurality of hub holes 410 may each be configured to receive a fastener to support removably attachment of modular components of the hub 402.

The modular press wheel 400 further include a plurality of rim features. The plurality of rim features may be removably attachable with the hub 402 in order to form the press wheel 400. With reference to FIGS. 4A and 4B, the press wheel 400 is shown as including a first rim feature 430, a second rim feature 450, a third rim feature 470, and a fourth rim feature 480. The rim features 430, 450, 470, 480 may each be removably attachable with the hub 402 in order to form the modular press wheel 400. For example, the first rim feature 430 may be removably connected to the hub 402 in order to form a first circumferential portion 406a of the modular press wheel 400, the second rim feature 450 may be removably connected to the hub 402 in order to form a second circumferential portion 406b of the modular press wheel 400, the third rim feature 470 may be removably connected to the hub 402 in order to form a third circumferential portion 406c of the modular press wheel 400, and the fourth rim feature 480 may be removably connected to the hub 402 in order to form a fourth circumferential portion 406d of the modular press wheel 400. The rim features 430, 450, 470, 480 may therefore cooperate to define a complete circumference of the modular press wheel 400, as shown in FIG. 4A.

For purposes of illustration, the first rim feature 430 is described in turn below. It will be appreciated that each of the rim features 430, 450, 470, 480 may be substantially similar or identical to one another, and therefore, the discussion and depiction of the components of the first rim feature 430 may apply equally to each of the rim features 430, 450, 470, 480 and/or any of the other rim features described herein. The first rim feature 430 may generally include a mounting portion 432 and a set of tread portions 440. The mounting portion 432 may be formed from a plate or sheet of metal material. For example, the mounting portion 432 may have a generally flat shape with a first mounting portion surface 433 and a second mounting portion surface 435 opposite the first mounting portion surface 433. In other cases, as described herein, the mounting portion 432 may have a curved or contoured profile, as may be appropriate for a given application. The mounting portion 432 may be used to facilitate connection of the first rim feature 430 with the hub 402. In the example of FIGS. 4A and 4B, the mounting portion 432 is defined by a generally arcuate shape with an inner curved surface 437 and an outer curved surface 434. The inner curved surface 437 and the outer curved surface 434 may generally have a similar curvature and run generally parallel one another. For example, the mounting portion 432 is shown in FIGS. 4B as having a first end 439a and a second end 439b, and the inner curved surface 437 and the outer curved surface 434 may run generally parallel one another from the first end 439a and to the second end 439*b*. The mounting portion 434 is further shown in FIGS. 4A and 4B as having a plurality of slots 436 spaced along the outer curved surface 434. Each of the slots 436 may be configured to receive a tread portion, such as a tine, as explained herein below. Further, the mounting portion 432 is shown as include a plurality of mounting portion holes 438, such as a mounting portion hole 438*a*. The holes of the plurality of mounting portion holes 438 may be configured to receive fastener of the modular press wheel 400 in order to facilitate the removable attachment of the first rim feature 430 to the hub 402.

The first rim feature 430 is also shown in FIG. 4B as including the set of tread portions 440. The set of tread portions 440 may include individual tread portions that are connected to the mounting portion 432 along the outer curved surface 434. The set of tread of tread portions 440 may be configured to engage soil to facilitate the firming operations described herein. For example, the set of tread portions may include tines 442. A given tine 442 may be defined by a cylindrical metal component, such as rod, that is bent or configured in a manner to define the tread portion of tracks of the modular press wheel 400. In the example of FIGS. 4A and 4B, the tines 442 may be configured to define a V-shape with a first tine portion 443*a* and a second tine portion 443*b* extend from a tine center 444. The tine 442 may be connected to the outer curved surface 434 at the tine center 444. For example, the tine center 444 may be seated in a respective one of the slots 436 and welded or otherwise connected to the mounting portion 432 at the slot 436. Each of the tine portions 443*a*, 443*b* may extend from the tine center 442 and generally away from a center axis or center plane of the mounting portion 432 (e.g., a plane that may be defined by one or both of the surfaces 433, 435). For example, the tine portions 443*a*, 443*b* may extend away from the center plane in one or more of a radial direction, an axial direction, or tangential direction such that one or both of the tine portions 443*a*, 443*b* define a chord relative to a radial surface (e.g., surface 433, 435) of the modular press wheel 400.

In the example of FIGS. 4A and 4B, the mounting portion 432 is shown connected with three tines 442, each separated by a void 445. This arrangement, in combination with the directional configuration of the tine portions 443*a*, 443*b*, may allow the modular press wheel 400 to have multiple points of contact with soil during rotation. As one example, terminal ends of the tine portions 443*a*, 443*b* may contact the soil at a substantially common point with a tine center of an adjacent tine. In this regard, at least some portion of adjacent tines, or adjacent tread portions more generally, may contact the ground at a common time during rotation of the modular press wheel 400. In other cases, other shape and orientations of the tines and tread portions are possible, as shown and described below with reference to FIGS. 7A-8.

With continued reference to FIG. 4B, the second rim feature 450 is shown including a second mounting portion 452, including ends 453*a*, 453*b*, and a second set of tread portions 460, which may be substantially analogous to the mounting portion 432 and the tread portions 440. Further, the third rim feature 470 is shown including a third mounting portion 472, including ends 473*a*, 473*b*, and a third set of tread portions 776, which may be substantially analogous to the mounting portion 432 and the tread portions 440. Further, the fourth rim feature 480 is shown including a fourth mounting portion 482, including ends 483*a*, 483*b*, and a fourth set of tread portion 486, which may be substantially analogous to the mounting portion 432 and the tread portions 440.

In the exploded view of FIG. 4B, a fastener 420 is also shown. The fastener 420 may be configured to facilitate the removably coupling of one or more of the rim features with the hub 402. In this regard, the fastener 420 is shown as including a bolt 421 and nut 422. The bolt 422 may be an elongated bolt with a threaded end. The nut 422 may be configured for threadable engagement with the bolt 421 at the treaded end.

The modular press wheel 400 may be coupled with the rim features 430, 450, 470, 480 removably attached to the hub 402. With continued reference to the first rim feature 430, the first rim feature 430 may be arranged such that the mounting portion 432 defines a lap joint or overlap with a portion of the hub 402, as shown in the cross-sectional view of FIG. 4C. For example, one or both of the surfaces 405, 407 of the hub 402 may define a rim feature engagement surface. Further, one or both of the surfaces 433, 435 of the mounting portion 432 may define a hub engagement surface. The first rim feature 430 and the hub 402 may be arranged overlapped and contacting along the rim feature engagement surface and the hub engagement surface. The first rim feature 430 and the hub 402 may be arranged in order to align the plurality of hub holes 410 with the plurality of mounting portion holes 438. The fastener 420 may then be advanced through an aligned pair of the holes (e.g., holes 410*a*, 438*a*) in order to removably secure the first rim feature 430 to the hub 402. Additional fasteners may be used to secure the first rim feature 430 to the hub 402 at each of aligned pairs of holes. With the first rim feature 430 removably attached to the hub 402, the tread portions 440 may define the circumferential portion 406*a* of the modular press wheel 400, as shown in FIG. 4A.

The second rim feature 450 may be removably coupled to the hub 402 in a similar manner such that the second set of tread portions 460 defines the circumferential portion 406*b* of the modular press wheel 400. The third rim feature 470 may be removably coupled to the hub 402 in a similar manner such that the third set of tread portions 476 defines the circumferential portion 406*c* of the modular press wheel 400. The fourth rim feature 480 may be removably coupled to the hub 402 in a similar manner such that the fourth set of tread portions 486 defines the circumferential portion 406*d* of the modular press wheel.

The rim features 430, 450, 470, 480 may be arranged end to end to define a complete circumference of the modular press wheel 400, as shown in FIG. 4A. For example, the first and second rim features 430, 450 may be removably coupled to the hub 402 with ends 439*b*, 453*a* adjacent one another to define the circumferential portions 406*a*, 406*b* as adjacent circumferential portions. Further, the second and third rim feature 450, 470 may be removably coupled to the hub 402 with ends 453*b*, 473*a* adjacent one another to define the circumferential portions 406*b*, 406*c* as adjacent circumferential portions. Further, the third and fourth rim features 470, 480 may be removably coupled to the hub 402 with ends 473*b*, 483*a* adjacent one another to define the circumferential portions 406*c*, 406*d* as adjacent circumferential portions. Further, the fourth and the first rim features 480, 430 may be removably coupled with the hub 402 with ends 483*b*, 439*a* adjacent one another to define the circumferential portions 406*d*, 406*a* as adjacent circumferential portions.

As shown in FIG. 4A, each of the rim features 430, 450, 470, 480 may overlap and extend beyond the edge 408 of the hub 402. In this regard, the diameter of the modular press wheel 400 may be defined by the size of the rim features 430, 450, 470, 480. Further, size and shape of the tread portion of the modular press wheel 400 may be defined by size and shape of respective tread portions of the rim features 430, 450, 470, 480 described herein. The modular press wheels described herein may be configured such that a diameter of the press wheel and/or a size or shape of respective tread portions may be changed. For example, differently size and/or shaped modular rim features may be swapped out with any one of the rim features 430, 450, 470, 480 described above in order to form a modular press wheel having a different diameter and/or a different size or shape of tread portions.

Figures 5A, 5B:
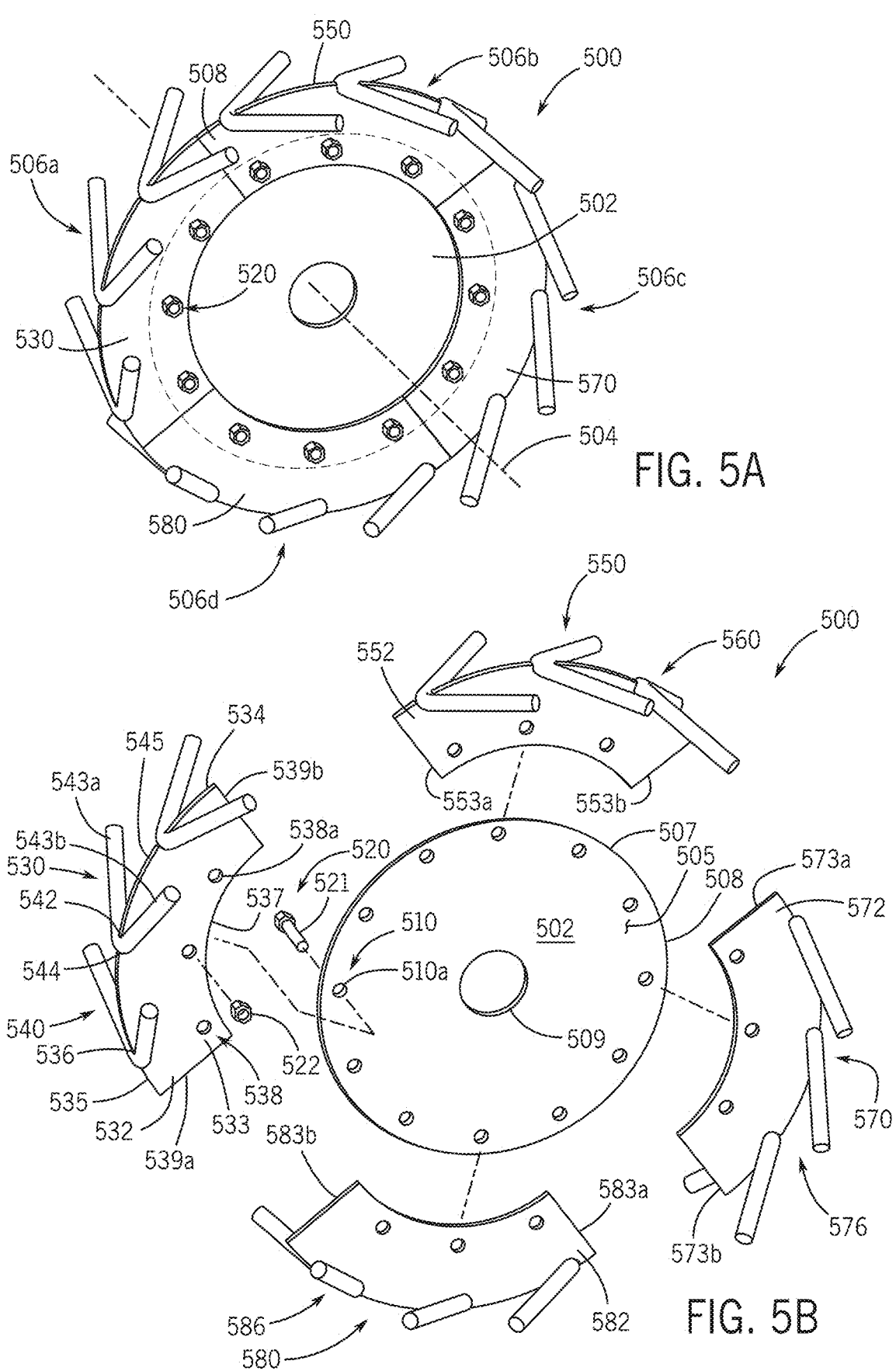
FIG. 5A depicts another example modular press wheel.
FIG. 5B depicts an exploded view of the modular press wheel of FIG. 5A.

For example, and with reference to FIGS. 5A and 5B, a press wheel 500 is shown. The press wheel 500 may be substantially analogous to the press wheel 400 and include a hub 502 and rim features 530, 550, 570, 580. The hub 502 may be a universal hub and may have size and shape that is substantially the same as the hub 402 described in relation to FIGS. 4A and 4B. In this regard, the hub 502 may include a first surface 505, a second surface 507, an outer circumferential edge 508, an axial hole 509, a plurality of hubs holes 510, such as a hub hole 510a; redundant explanation of which is omitted here for clarity. Further, the first rim feature 530 may be a modular component similar to the first rim feature 430 described in relation to FIGS. 4A and 4B. In this regard, the first rim feature 530 may include a mounting portion 532, a set of tread portions 540, a first surface 533, a second surface 535, an inner curved surface 537, an outer curved surface 534, ends 539a, 539b, slots 536, an plurality of mounting holes 538, including hole 538a, tines 542, tine centers 544, first tine portion 534a, second tine portion 534b, and voids 545; redundant explanation of which is omitted here for clarity.

The second rim feature 550 may be substantially analogous to the first rim feature 530 and include a mounting portion 552, a tread portion 560, and ends 553a, 553b. The third rim feature 570 may be substantially analogous to the first rim feature 530 and include a mounting portion 572, a set of tread portions 576, and ends 573a, 573b. The fourth rim feature 580 may be substantially analogous to the first rim feature 580 and include a mounting portion 582, a set of tread portion 586, and ends 583a, 583b. The tread portion 540 of the first rim feature 530 may define a first circumferential portion 506a of the modular press wheel 500 when removably attached to the hub 502. The tread portion 560 of the second rim feature 560 may define a second circumferential portion 506b of the modular press wheel 500 when removably attached to the hub 502. The tread portion 576 of the third rim feature 570 may define a third circumferential portion 506c of the modular press wheel 500 when removably attached to the hub 502. The tread portion 586 of the fourth rim feature 580 may define a fourth circumferential portion 506d of the modular press wheel 500 when removably attached to the hub 502. The rim features 530, 550, 570, 580 may be removably attached using fasteners 520, including a threaded bolt 521 and nut 522.

Notwithstanding the foregoing similarities, the rim features 530, 550, 570, 580 shown in FIGS. 5A and 5B may be larger than the rim features 430, 450, 470, 480 shown in FIG. 4A and 4B. For example, the mounting portion 532 of the first rim feature 530 may have a larger radial dimension such that the inner curved surface 537 the outer curved surface 534 are further away from one another. As such, upon removably attachment of the first rim feature 530 to the hub 502 (which may be the same as the hub 402), the mounting portion 532 extends beyond the circumferential edge 508 of the hub 502 by a greater amount, thereby increasing the diameter of the modular press wheel 500, as compared to the modular press wheel 400. The rim features 550, 570, 580 may have a similar size as the rim feature 530 so that the rim features 530, 570, 580, collectively, form the larger diameter of the modular press wheel 500.

The rim features 530, 550, 570, 580 are shown in FIGS. 5A and 5B as having tread portions of generally similar size and shape as compared to the tread portions of the corresponding rim features of FIGS. 4A and 4B. It will be appreciated, however, that the rim features may have any appropriate tread pattern, size, and/or shape, as may be required for a particular application. For example, a rim feature may have tread portions that are smaller or larger than the tread portions shown in FIGS. 4A-5B. Further, a rim feature may have tread portions that are more or less densely arranged as compared to the tread portions shown in FIGS. 4A-5B. Further, a rim feature may have tread portions that are differently shaped as compared to the tread portions shown in FIGS. 4A-5B. In other cases, other variations of the tread portions are possible. This may allow a farmer or other user to change one modular rim feature for another in order to change the size or type of tread portions without replacing the entire press wheel.

Figures 6A, 6C:
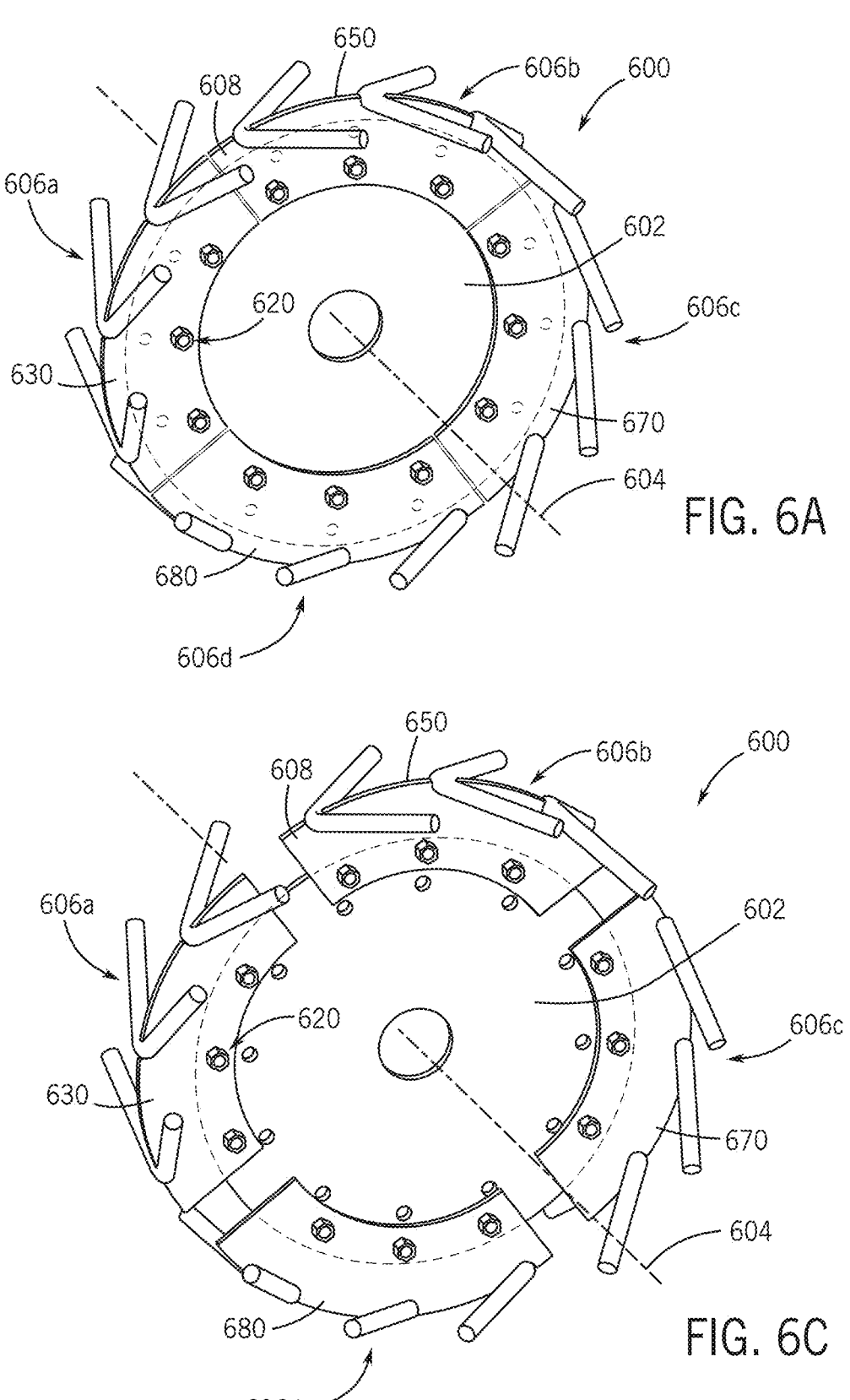
FIG. 6A depicts another example modular press wheel in a first configuration.
FIG. 6C depicts the modular press wheel of FIG. 6A in a second configuration.
Figure 6B:
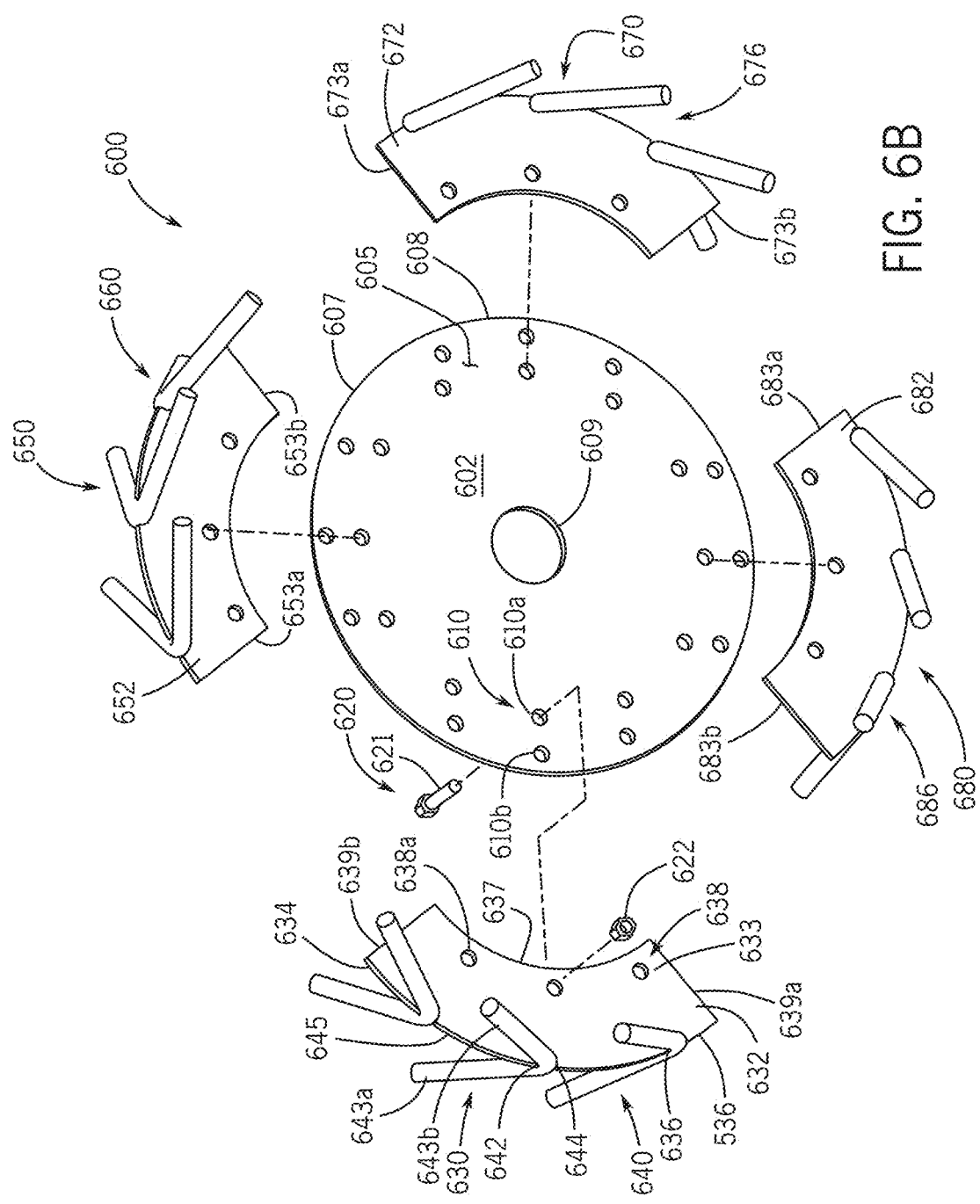
FIG. 6B depicts an exploded view of the modular press wheel of FIG. 6A.

In another example, the modular press wheel of the present disclosure may be configured to define a press wheel having a first diameter in a first configuration and a second diameter in a second configuration. The first and second diameters may be defined using the same set of a hub and accompanying rim features. For example, and with reference to FIGS. 6A-6C, a press wheel 600 is shown. With reference to FIG. 6A, the press wheel 600 is shown in a first configuration in which the press wheel 600 has a first diameter. The press wheel 600 may be adaptable or modifiable to define a second diameter in a second configuration, as shown with reference to FIG. 6C, using the same or same-sized components as that shown in FIG. 6A.

Initially, the press wheel 600 may be substantially analogous to the press wheel 400 and include a hub 602 and rim features 630, 650, 670, 680. The hub 602 may be a universal hub and may have size and shape that is substantially the same as the hub 402 described in relation to FIGS. 4A and 4B. In this regard, the hub 602 may include a first surface 605, a second surface 607, an outer circumferential edge 608, an axial hole 609, a plurality of hubs holes 610, such as a hub holes 610a; redundant explanation of which is omitted here for clarity. Further, the first rim feature 630 may be a modular component similar to the first rim feature 630 described in relation to FIGS. 4A and 4B. In this regard, the first rim feature 630 may include a mounting portion 632, a set of tread portions 640, a first surface 633, a second surface 635, an inner curved surface 637, an outer curved surface 634, ends 639a, 639b, slots 636, an plurality of mounting holes 638, including hole 638a, tines 642, tine centers 644, first tine portion 634a, second tine portion 634b, and voids 645; redundant explanation of which is omitted here for clarity.

The second rim feature 650 may be substantially analogous to the first rim feature 630 and include a mounting portion 652, a tread portion 660, and ends 653a, 653b. The third rim feature 670 may be substantially analogous to the first rim feature 630 and include a mounting portion 672, a set of tread portions 676, and ends 673a, 673b. The fourth rim feature 680 may be substantially analogous to the first rim feature 680 and include a mounting portion 682, a set of tread portion 686, and ends 683a, 683b. The tread portion 640 of the first rim feature 630 may define a first circumferential portion 606a of the modular press wheel 600 when removably attached to the hub 602. The tread portion 660 of the second rim feature 660 may define a second circumferential portion 606b of the modular press wheel 600 when removably attached to the hub 602. The tread portion 676 of the third rim feature 670 may define a third circumferential portion 606c of the modular press wheel 600 when removably attached to the hub 602. The tread portion 686 of the fourth rim feature 680 may define a fourth circumferential portion 606d of the modular press wheel 600 when removably attached to the hub 602. The rim features 630, 650, 670, 680 may be removably attached using fasteners 620, including a threaded bolt 621 and nut 622.

Notwithstanding the foregoing similarities, the press wheel 600 may be configured to transition between the first configuration of FIG. 6A (in which the press wheel 600 has a first, smaller diameter), to the second configuration of FIG. 6C (in which the press wheel 600 has a second, larger diameter). The press wheel 600 may be configured to transition between the first and second diameters using the same or similarly-sized components in each configuration. In order to facilitate the foregoing, the hub 602 may include at least two generally concentric rings of hub holes. For example, the plurality of hub holes 610a may be a first plurality of hub holes that define a first ring of hub holes about a rotational axis of the hub 602. Further, a second plurality of hub holes 610b may define a second ring of hub holes about the rotational axis of the hub 602. The second plurality of hub holes 610b may define the ring of hub holes generally around the first plurality of hub holes 610a. For example, the ring defined by the second plurality of hub holes 610b may generally have a diameter that is larger than a diameter of the ring that is defined by the first plurality of hub holes 610a.

In order to define the first configuration having the first diameter of FIG. 6A, the rim features 630, 650, 670, 680 may be coupled to the hub 602 at respective holes of the plurality of hub holes 610a. For example, the diameter of the press wheel 600 may be based on the position of the rim features 630, 650, 670, 680 as defined relative to the hub 602. In this regard, the rim features 630, 650, 670, 680 may define a first diameter of the press wheel based on the relatively smaller diameter defined by the first plurality of hub holes 610a. Further, in order to define the second configuration having the second diameter of FIG. 6C, the rim features 630, 650, 670, 680 may be coupled to the hub 602 at respective holes of the plurality of hub holes 610b. As described above, the diameter of the press wheel 600 may be based on the position of the rim features 630, 650, 670, 680 as defined relative to the hub 602. In this regard, the rim features 630, 650, 670, 680 may define a second diameter of the press wheel based on the relatively larger diameter defined by the second plurality of hub holes 610b.

In some cases, gaps may be defined between adjacent rim features 630, 650, 670, 680 along the circumference of the modular wheel in the second configuration of FIG. 6C. In this regard, plates, inserts, and/or other features, such as those attached by a welds, bolts and/or other fastening techniques may be connected to the hub 602 at the gaps. Accordingly, the inserts may operate to fill in a portion of a given gap, which may add strength and rigidity to the modular wheel 600. For example, the inserts may be connected to the hub 602 and extend therefrom to the outer circumference of the modular wheel 600 that is defined by the rim features 630, 650, 670, 680.

Figures 7A, 7B, 7C, 7D:
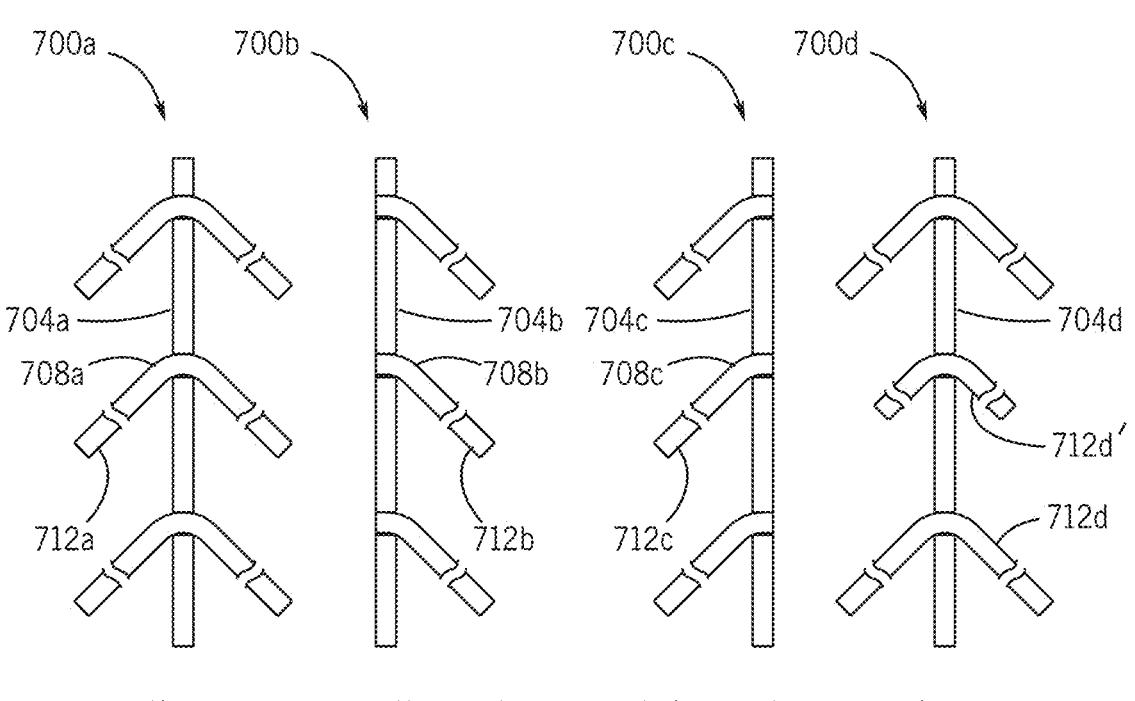
FIG. 7A depicts a top view of an example rim feature.
FIG. 7B depicts a top view of another example rim feature.
FIG. 7C depicts a top view of another example rim feature.
FIG. 7D depicts a top view of another example rim feature.

With reference to FIGS. 7A-7G different variations of tread portions are shown. It will be appreciated that any of the tread portions shown with reference to FIGS. 7A-7G may be used in the modular press wheels shown above in FIGS. 4A-6C. In FIG. 7A, a rim feature 700a is shown having a mounting portion 704a and a tread portion 708a. The tread portion 708a may be defined by a series of V-shaped tines 712a. The tines 712a may have any appropriate length and spacing, as may be required for a given application. In FIG. 7B, a rim feature 700b is shown having a mounting portion 704b and a tread portion 708b. The tread portion 708b may be defined by a series of one-sided tines 712b that extend from a right-hand side of the mounting portion 704b. The tines 712b may have any appropriate length and spacing, as may be required for a given application. In FIG. 7C, a rim feature 700c is shown having a mounting portion 704c and a tread portion 708c. The tread portion 708c may be defined by a series of one-sided tines 712c that extend from a left-hand side of the mounting portion 704c. The tines 712c may have any appropriate length and spacing, as may be required for a given application. In FIG. 7D, a rim feature 700d is shown having a mounting portion 704d and a tread portion 708d. The tread portion 708d may be defined by series of alternating short V-shaped tines 712d and long V-shaped tines 712d′. The tines 712d, 712d′ may have any appropriate length and spacing, as may be required for a given application.

Figures 7E, 7F:
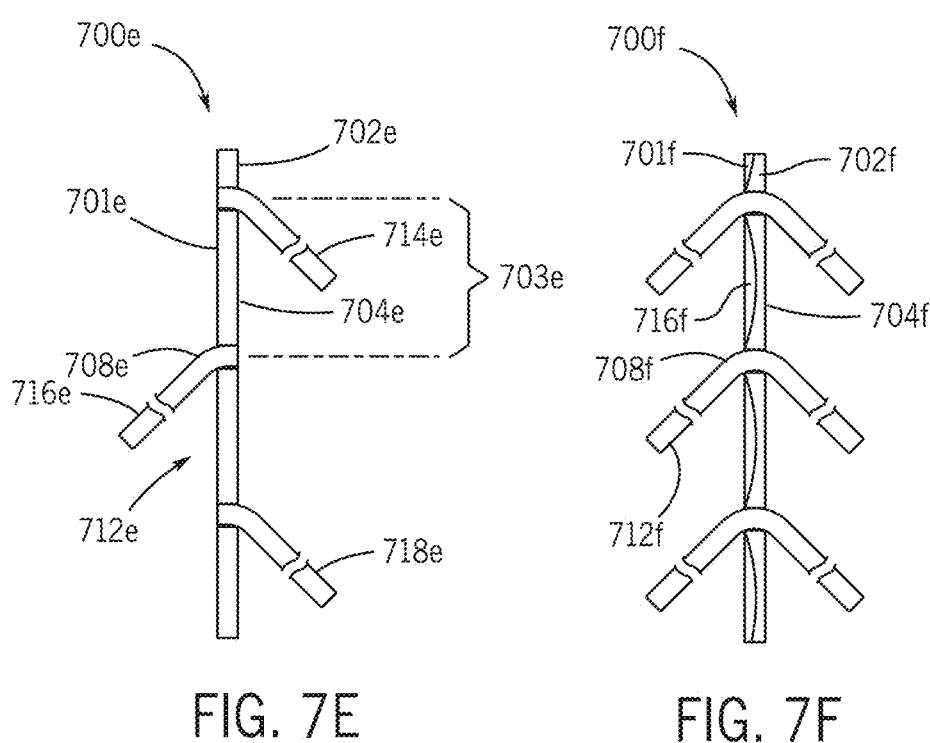
FIG. 7E depicts a top view of another example rim feature.
FIG. 7F depicts a top view of another example rim feature.

In FIG. 7E, a rim feature 700e is shown having a mounting portion 704e and a tread portion 708e. The tread portion 708e may be defined by a series of tines 712e that are alternatingly disposed along either side of the mounting portion 704e. For example, a first tine 714a of the series of tines 712e may be disposed to extend from a first side 702e of the mounting portion 704e, a second tine 716e of the series of tines 712e may be disposed to extend from a second side 701e of the mounting portion 704e, a third tine 718e of the series of tines 712e may be disposed to extend from the first side 702e of the mounting portion 704e, and so on, as may be appropriate for a given configuration of the modular assembly. Further, the series of tines 712e may be staggered along the mounting portion 704e, such that each tine is offset from an adjacent tine. As shown in FIG. 7E, the first tine 714e may be separated from the second tine 716e by an offset 703e. Further, at a circumferential position of the first tine 714e on the mounting portion 704e, there may be no tine extending from the second side 701e. Further, at a circumferential position of the second tine 716e on the mounting portion 704e, there may no tine extending from the first side 702e. Further, at the circumferential position of the third tine 718e on the mounting portion 704e, there may be no tine extending from the second side 701e, and so along the circumference of the mounting portion 704e. In this regard, the series of tines 712e may cooperate to form a staggered tine pattern with adjacent tines of the series extending from opposing sides of the mounting portion 704e, as shown in FIG. 7E. The tines 712e may have any appropriate length and spacing, as may be required for a given application.

Figure 7G:
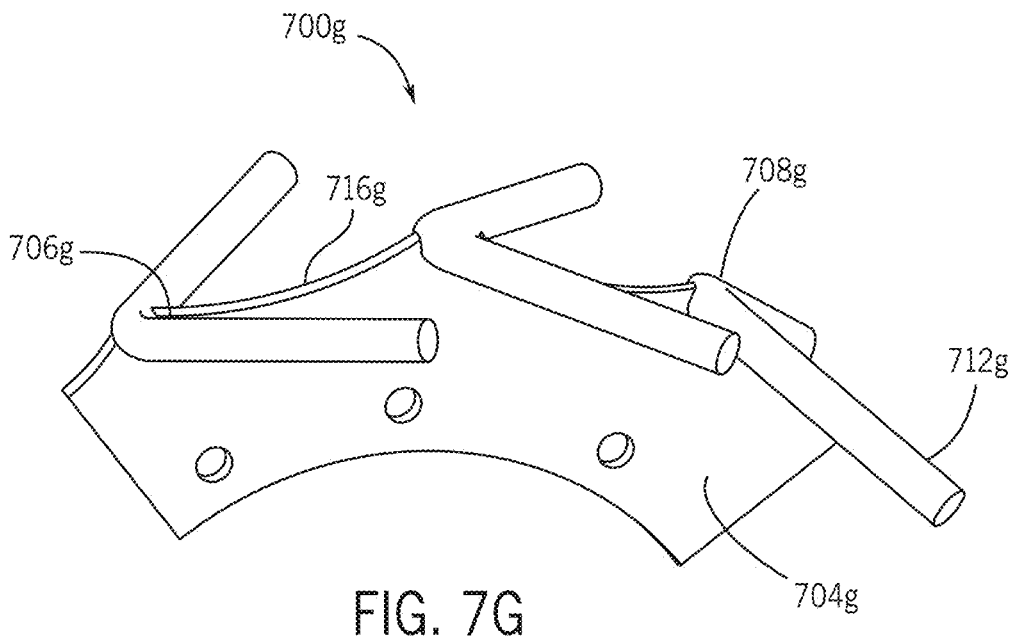
FIG. 7G depicts a side view of another example rim feature.

In FIG. 7F, a rim feature 700f is shown having a mounting portion 704f and a tread portion 708f. The tread portion 708f may be defined by a series of V-shaped tines 712f. The tines 712f may have any appropriate length and spacing, as may be required for a given application. As shown in FIG. 7F, the mounting portion 704f may define a first side 701f and a second side 702f that is generally opposite the first side 701f. The mounting portion 704f may further define a series of cupped or scalloped features 716f. The scalloped features 716 may be generally concave indents or grooves formed into the mounting portion 704f at the first side 701f. In the example of FIG. 7F, a single scalloped feature 716f is shown defined between adjacent times 712f, all of which are at the first side 701f. In this regard, the second side 702f may have a flat or generally smooth contour. In other examples, scalloped features 716 may additionally or alternatively be defined in at the second side 702*f,* including variations in which multiple scalloped features 716*f* are defined between adjacent tines 716*f.* In FIG. 7G, a rim feature 700*g* is shown having a mounting portion 704*g* and a tread portion 708*g.* The tread portion 708*g* may be defined by a series of V-shaped tines 712*g.* The tines 712*g* may have any appropriate length and spacing, as may be required for a given application. As shown in FIG. 7G, the mounting portion 704*g* may include an outer periphery 706*g.* The outer periphery 706*g* may define a scalloped features 716*g* that extend into a body of the mounting portion 704*g.* For example, the scalloped feature 716*g* may be concave grooved or indented feature that are cut or scalloped into the mounting portion 704*g* at the outer periphery 706*g.* In the example of FIG. 7G, a single scalloped portion 716 is shown extend between adjacent tines 712*g.* In other cases more or fewer scalloped features and/or scalloped features may be defined by the outer periphery 706*g* as may be appropriate for a given application. In other examples, other configuration and arrangement of the tines are possible and contemplated herein.

Figure 8:
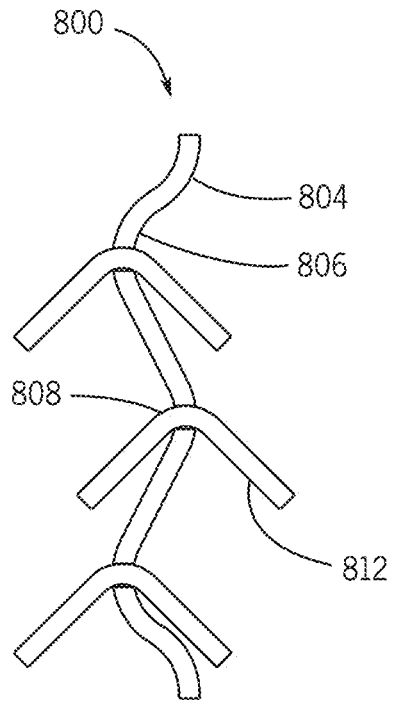
FIG. 8 depicts a top view of another example rim feature.

In other examples a shape of the mounting portion may be modified. For example, rather than a substantially flat plate, the mounting portion may be a complex, wavy, and/or irregular shape, which may by formed from a casting process. For example, and as shown in FIG. 8, a rim feature 800 may include a mounting portion 804 connected to a set of tread portions 808 that is defined by V-shaped tines 812. The mounting portion 804 may have a wavy shape or other curvature.

Figure 9:
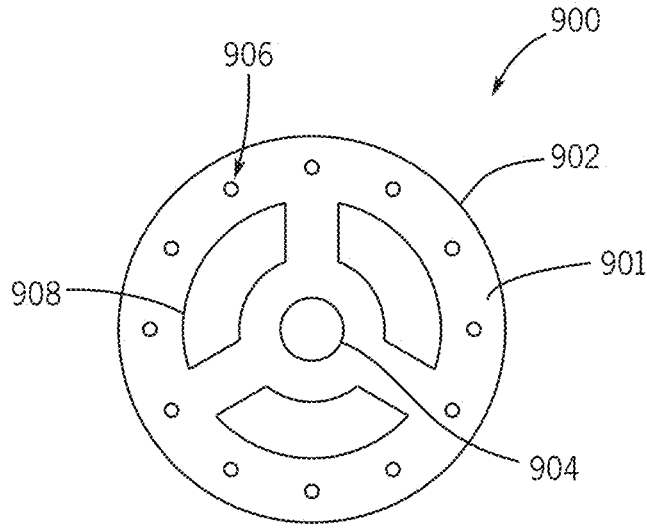
FIG. 9 depicts another example hub.

The hub 402 and the hub 502 are shown in FIGS. 4A-6*c* above as being substantially the same component of similar size and shape. The modular press wheel of the present disclosure may include various other hubs based on a given application. For example, FIG. 9 shows a hub 900. The hub 900 may be formed from a sheet of metal 901 and have an outer circumferential surface 902 and an axial hole 904. A plurality of hub holes 906 may be formed through the sheet 901 and be configured for removably coupling modular components of a given modular press wheel. Notwithstanding the foregoing, the hub 900 is shown in FIG. 9 as including cutouts 908. The cutouts 908 may be formed through a complete thickness of the sheet 901. In some cases, the cutouts 908 may be configured to reduce an overall weight of the hub 900 and associated press wheel. In other examples, other configurations of the hub 902 are possible.

Figure 10:
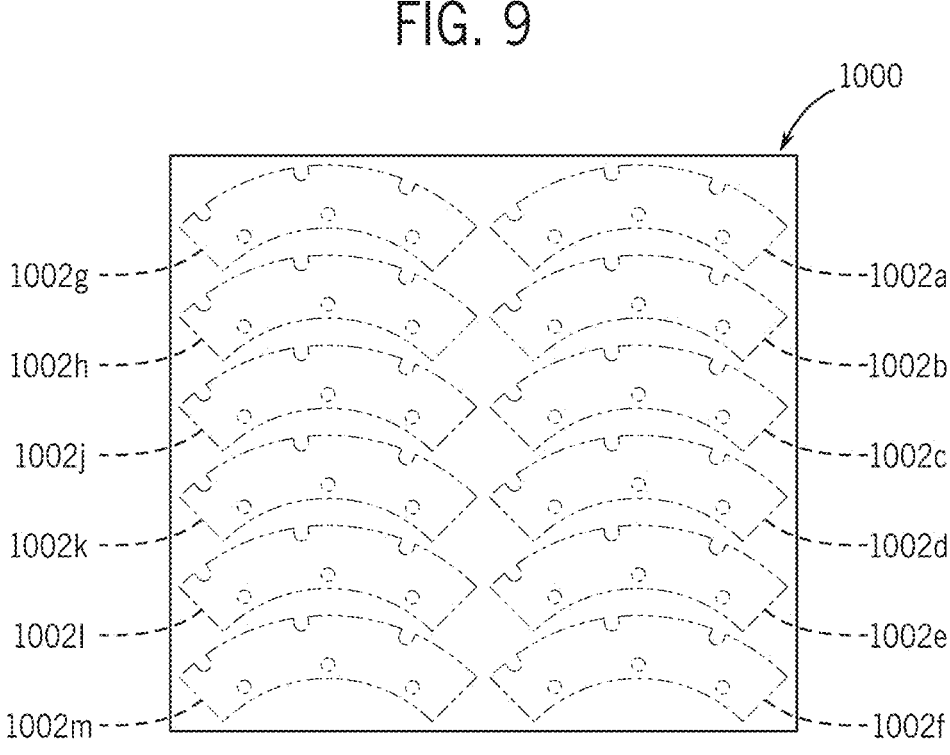
FIG. 10 depicts an example metal sheet including a template for mounting portions of the present disclosure.

One or more components of the modular press wheels described herein may be manufactured from a single sheet of material. For example, and with reference to FIG. 10, a single sheet of metal material 1000 is shown. In the present example, the single sheet 1000 may be used to form multiple mounting portions of a modular press wheel. For example, the single sheet 1000 is show as including an outline for (shown in dash line), a first mounting portion 1002*a,* a second mounting portion 1002*b,* a third mounting portion 1002*c,* a fourth mounting portion 1002*d,* a fifth mounting portion 1002*e,* a sixth mounting portion 1002*f,* a seventh mounting portion 1002*g,* an eighth mounting portion 1002*h,* a ninth mounting portion 1002*i,* a tenth mounting portion 1002*j,* an eleventh mounting portion 1002*k,* and a twelfth mounting portion 1002*l.* In this regard, the single sheet of material 1000 may be used to produce twelve mounting portions, which may reduce material reduce and manufacturing costs.

Figure 11:
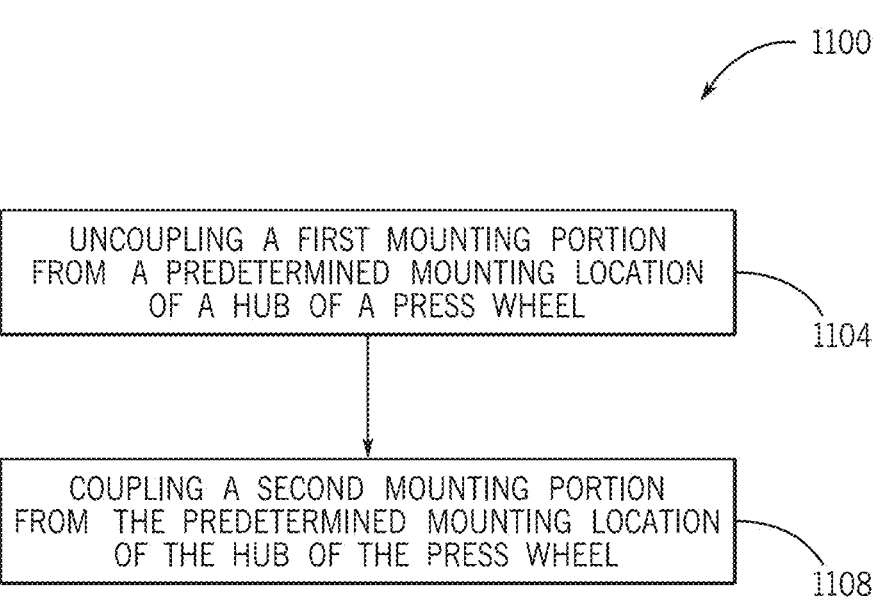
FIG. 11 depicts a flow diagram of a method of modifying a modular press wheel.

To facilitate the reader's understanding of the various functionalities of the examples discussed herein, reference is now made to the flow diagram in FIG. 11, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 1104, a first mounting portion is uncoupled from a predetermined mounting location of a hub of modular press wheel. The first mounting portion may have a first size and connected to a first plurality of tread portions. The first plurality of tread portions may define a circumferential portion of the press wheel. For example, and with reference to FIG. 4A, the mounting portion 432 may be uncoupled from the hub 402. The mounting portion 432 may have a first, smaller size, and have the set of tread portions 440 that define the circumferential portion 406*a.* The mounting portion 432 may be uncoupled from the hub 402 may loosening the faster 420 such that the mounting portion 432 may be separated from the hub 402.

At operation 1108, a second mounting portion is coupled to the predetermined mounting location of the hub. The second mounting portion may have a second size and connected to a second plurality of tread portions. The second plurality of tread portions may define the circumferential portion upon the coupling of the second mounting portion of the predetermined mounting location. For example, and with reference to FIGS. 4A-5B, the mounting portion 530 may be coupled to the hub 402. The mounting portion 530 may have a second, larger size, and have the set of tread portions 540. Accordingly, upon coupling the mounting portion 530 to the hub 402, the modular press wheel may exhibit the second size, with the tread portions 540 defining the circumferential portion 506*a.* The mounting portion 530 may be coupled to the hub 402 may extending the fastener through an aligned pair of holes of the mounting portion 530 and holes of the hub 402.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A modular press wheel comprising
a hub configured to rotate about an axis and defining a rim feature engagement surface on an exterior side of the hub;
a first rim feature comprising
    a first mounting portion removably attachable to the hub, and
    a first set of tread portions connected to the first mounting portion and configured to define a first circumferential portion of the modular press wheel; and
a second rim feature separate from the first rim feature, the second rim feature comprising a second mounting portion removably attachable to the hub independently from the first mounting portion, and a second set of tread portions connected to the second mounting portion and configured to define a second circumferential portion of the modular press wheel; wherein each of the first mounting portion and the second mounting portion are removably attachable along the rim feature engagement surface at the exterior side of the hub and each of the first mounting portion and the second mounting portion defining a lap joint with the rim feature engagement surface.

2. The modular press wheel of claim 1, wherein, for at least the first set of tread portions, each tread portion of the first set of tread portions comprises a tine extending away from a center plane of the first mounting portion, wherein the center plane is substantially perpendicular to the axis upon removable attachment of the first rim feature with the hub.

3. The modular press wheel of claim 1, wherein at least the first mounting portion comprises a first mounting plate having an inner curved edge, and an outer curved edge opposite the inner curved edge, and the first set of tread portions is connected to the first mounting plate along the outer curved edge.

4. The modular press wheel of claim 3, wherein the first mounting plate comprises a hub engagement surface extending from the inner curved edge to the outer curved edge, and the hub and the first mounting portion are removably attachable to define the lap joint along a portion of the rim feature engagement surface and a portion of the hub engagement surface.

5. The modular press wheel of claim 4, wherein the hub comprises a series of hub holes circumferentially spaced about the axis, and the first mounting plate comprises a series of first mounting plate holes circumferentially spaced about the axis and alignable with the series of hub holes, upon removable attachment of the first mounting plate with the hub.

6. The modular press wheel of claim 5, further comprising a fastener configured to removably attach the hub and the first mounting plate and advanceable through an aligned pair of a hub hole of the series of hub holes and a first mounting plate hole of the series of first mounting plate holes.

7. The modular press wheel of claim 3, wherein, upon removable attachment of the hub and the first mounting portion, the outer curved edge extends beyond an outermost circumferential edge of the hub.

8. The modular press wheel of claim 1, wherein the first and second circumferential portions are adjacent circumferential portions of the modular press wheel.

9. A modular press wheel comprising a hub configured to rotate about an axis and having an exterior side extending to an outer circumferential edge;

a mounting portion removably attachable to the hub and having a center plane substantially perpendicular to the axis upon removable attachment with the hub; and a plurality of tread portions connected to the mounting portion and configured to define a circumferential portion of the modular press wheel, the plurality of tread portions having voids between adjacent tread portions, wherein each tread portion of the plurality of tread portions comprises a tine extending away from the center plane, wherein:

the mounting portion is a first mounting portion of a set of mounting portions, the set of mounting portions comprises a second mounting portion removably attachable to the hub independently of the first mounting portion, and the set of mounting portions are removably attachable along the exterior side of the hub and extend beyond the outer circumferential edge.

10. The modular press wheel of claim 9, wherein each mounting portion of the set of mounting portions is removably attachable with the hub and connected with a corresponding plurality of tread portions, and wherein each mounting portions of the set of mounting portions cooperate to define a complete circumferential portion of the modular press wheel.

11. The modular press wheel of claim 10, wherein the set of mounting portions comprises four mounting portions including the first mounting portion and the second mounting portion, each mounting portion of the four mounting portions having a common arcuate shape that is configured to establish the four mounting portions in a substantially circular shape when the four mounting portions are arranged end to end with one another.

12. The modular press wheel of claim 10, wherein each mounting portion of the set of mounting portions contacts one or more adjacent mounting portions upon removable attachment of the mounting portion with the hub.

13. The modular press wheel of claim 9, wherein a shape or a size of the tine of respective tread portion of the plurality of tread portions varies along the circumferential portion.

14. The modular press wheel of claim 9, wherein the mounting portion comprises a mounting plate defining a series of slots along an outermost circumferential edge of the mounting portion, and the plurality of tread portions is connected to the mounting portion via welds formed between a slot of the series of slots and the tine of a respective tread portion of the plurality of tread portions.

15. The modular press wheel of claim 9, wherein the a first mounting portion has a first size, the plurality of tread portions is a first plurality of tread portions, the modular press wheel further comprises the second mounting portion having a second size and removably attachable to the hub and connected with a second plurality of tread portions, in a first configuration, the first mounting portion is removably attached to the hub at a predetermined mounting location defined at the exterior side with the first plurality of tread portions spaced apart from the axis based on the first size of the first mounting portion, and in a second configuration, the second mounting portion is removably attached to the hub at the predetermined mounting location with the second plurality of tread portions spaced apart from the axis based on the second size of the second mounting portion, the second size larger than the first size.

16. A method for modifying a modular press wheel, the method comprising uncoupling a first set of mounting portions from an exterior side of the hub, the first set of mounting portions including a first mounting portion and a second mounting portion, wherein uncoupling the first set of mounting portions includes uncoupling the first mounting portion from a predetermined mounting location defined along the exterior side of the hub independently from the second mounting portion, the first mounting portion having a first size and connected to a first plurality of tread portions, the first plurality of tread portions defining a circumferential portion of the modular press wheel; and coupling a second set of mounting portions to the exterior side of the hub, the second set of mounting portions including a third mounting portion and a fourth mounting portion, wherein coupling the second set of mounting portions includes coupling the third mounting portion to the predetermined mounting location defined along the exterior side of the hub independently from the fourth mounting portion, the third mounting portion having a second size and connected to a second plurality of tread portions, the second plurality of tread portions defining the circumferential portion upon the coupling of the second mounting portion of the predetermined mounting location.

17. The method of claim 16, wherein the second size is larger than the first size such that the coupling of the third mounting portion to the predetermined mounting location increases a radius of the modular press wheel.

18. The method of claim 16, wherein the second plurality of tread portions has a different size, shape or arrangement than the first plurality of tread portions such that the coupling of the third mounting portion to the predetermined mounting location changes the size, shape, or arrangement of tread portions along the circumferential portion of the modular press wheel.

19. The method of claim 16, wherein uncoupling the first mounting portion further comprises loosening a fastener and removing the fastener from an aligned pair of a hub hole of the hub and a first mounting portion hole of the first mounting portion, and coupling the third mounting portion further comprises extending the fastener through an aligned pair of the hub hole and a second mounting portion hole of the third mounting portion.

\* \* \* \* \*